US010725431B2

(12) United States Patent
Larsen et al.

(10) Patent No.: US 10,725,431 B2
(45) Date of Patent: *Jul. 28, 2020

(54) ATOMIC CLOCK SYSTEM

(71) Applicant: NORTHROP GRUMMAN SYSTEMS CORPORATION, Falls Church, VA (US)

(72) Inventors: Michael S. Larsen, Woodland Hills, CA (US); Thad G. Walker, Madison, WI (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,614

(22) Filed: Dec. 12, 2019

(65) Prior Publication Data

US 2020/0117146 A1 Apr. 16, 2020

Related U.S. Application Data

(63) Continuation of application No. 15/722,595, filed on Oct. 2, 2017, now Pat. No. 10,539,929.

(Continued)

(51) Int. Cl.

| | |
|---|---|
| ***G04F 5/14*** | (2006.01) |
| ***H02H 3/02*** | (2006.01) |
| ***H05H 3/02*** | (2006.01) |

(52) U.S. Cl.

CPC ............... *G04F 5/145* (2013.01); *H05H 3/02* (2013.01)

(58) Field of Classification Search

CPC .................................. G04F 5/145; H05H 3/02

See application file for complete search history.

(56) References Cited

U.S. PATENT DOCUMENTS 5,136,261 A 8/1992 Lewis
7,893,780 B2 2/2011 Bulatowicz et al.

(Continued)

FOREIGN PATENT DOCUMENTS

EP 2131500 A2 12/2009
EP 2282243 A2 2/2011

(Continued)

OTHER PUBLICATIONS

Rosenbusch: "Magnetically Trapped Atoms for Compact Atomic Clocks" Applied Physics B, Lasers and Optics, 2009, pp. 227-235.

(Continued)

*Primary Examiner* — Jeffrey M Shin

(74) *Attorney, Agent, or Firm* — Tarolli, Sundheim, Covell & Tummino LLP

(57) ABSTRACT

An atomic clock system includes a magneto-optical trap (MOT) system that traps alkali metal atoms in a cell during a trapping stage of each of sequential coherent population trapping (CPT) cycles. The system also includes an interrogation system that generates an optical difference beam comprising a first optical beam having a first frequency and a second optical beam having a second frequency different from the first frequency. The interrogation system includes a direction controller that periodically alternates a direction of the optical difference beam through the cell during a CPT interrogation stage of each of the sequential clock measurement cycles to drive CPT interrogation of the trapped alkali metal atoms. The system also includes an oscillator system that adjusts a frequency of a local oscillator based on an optical response of the CPT interrogated alkali metal atoms during a state readout stage in each of the sequential clock measurement cycles.

25 Claims, 5 Drawing Sheets

Related U.S. Application Data

(60) Provisional application No. 62/406,653, filed on Oct. 11, 2016.

(56) References Cited

U.S. PATENT DOCUMENTS

| | | | |
|---|---|---|---|
| 7,965,148 B2 | 6/2011 | Larsen | |
| 8,237,105 B1 | 8/2012 | Bulatowicz et al. | |
| 2014/0028405 A1 | 1/2014 | Hong | |
| 2014/0355640 A1 | 12/2014 | Yun et al. | |
| 2018/0101139 A1 * | 4/2018 | Larsen | H05H 3/02 |

FOREIGN PATENT DOCUMENTS

| | | |
|---|---|---|
| JP | 2009129955 A | 6/2009 |
| JP | 201219261 A | 1/2012 |
| JP | 2018085719 A | 5/2018 |
| KR | 20130082468 A | 7/2013 |

OTHER PUBLICATIONS

Lewandowski et al: "Observation of Anomalous Spin-State Segregation in a Trapped Ultracold Vapor" Physical Review Letters, vol. 88, No. 7, Feb. 18, 2002, JILA, National Institute of Standards and Technology and Department of Physics, University of Colorado, Boulder, Colorado 80309-0440 (Received Sep. 21, 2001; published Jan. 30, 2002).

Sarkany, et al.: "Controlling the Magnetic-Field Sensitivity of Atomic-Clock States by Microwave Dressing" Physical Review A 90, 053416 (2014) CQ Center for Collective Quantum Phenomena and their Applications, Physikalisches Institut, Eberhard Karls Universitat Tubingen, Auf der Morgenstelle 14, D-72076 Tubingen, Germany (received Sep. 18, 2014; published Nov. 13, 2014).

Ivanov, et al.: "Offset Phase Locking of Noisy Diode Lasers Aided by Frequency Division"; Rev Sci Instrum. Aug. 2011; 82(8):083110. doi: 10.1063/1.3627535.; found on the Internet at: http://ft.boulder.nist.gov/general/pdf/2530.pdf.

Hoth, et al.: "Atom Number in Magneto-Optic Traps with Millimeter Scale Laser Beams"; Published: Feb. 22, 2013; Optics Letters vol. 38 Issue: 5; found on the internet at: http://ws680.nist.gov/publication/get_pdf.cfm?pub_id=912925.

Farkas, et al.: "A Compact Microchip Atomic Clock Based on All-Optical Interrogation of Ultra-Cold Trapped Rb Atoms"; Appl. Phys. B (2010) 101: 705. https://doi.org/10.1007/s00340-010-4267-4.

Esnault, et al. 4: "Towards a Compact Cold Atom Frequency Standard Based on Coherent Population Trapping"; Published: May 24, 2012; Proceedings Title: Proceedings of the 2012 IEEE International Frequency Control Symposium Conference Dates: May 21-24, 2012 Conference Location: Baltimore, MD Conference Title: 2012 IEEE International Frequency Control Symposium; pp. 465-469; found on the internet at: http://ws680.nist.gov/publication/get_pdf.cfm?pub_id=911637.

Esnault, et al. 3: "Status of a Compact Cold-Atom CPT Frequency Standard"; Published: Jul. 31, 2011; Proceedings Title: Proceedings of the 2011 Joint IEEE International Frequency Control Symposium and European Frequency and Time Forum Conference Dates: May 1-5, 2011 Conference Location: San Francisco, CA; pp. 612-614; found on the internet at: https://www.nist.gov/publications/status-compact-cold-atom-cpt-frequency-standard.

Esnault, et al. 2: "A Compact Cold-Atom Frequency Standard Based on Coherent Population Trapping"; Published: May 24, 2012; Proceedings Title: Proceedings of the 2012 IEEE International Frequency Control Symposium Conference Dates: May 21-24, 2012 Conference Location: Baltimore, MD Conference Title: 2012 IEEE International Frequency Control Symposium; found on the internet at: http://ws680.nist.gov/publication/get_pdf.cfm?pub_id=911637.

Esnault, et al.: "Cold-atom Double-? Coherent Population Trapping Clock"; Published: Oct. 31, 2013; Citation: Physical Review A, vol. 88; pp. 042120-1 through 042120-5; found on the internet at: http://ws680.nist.gov/publication/get_pdf.cfm?pub_id=913692.

Donley, et al. 4: "Frequency Biases in a Cold-Atom Coherent Population Trapping Clock"; Published: May 22, 2014; Proceedings Title: Proceedings of the IEEE International Frequency Control Symposium Conference Dates: May 20-22, 2014 Conference Location: Taipei, -1 Conference Title: 2014 IEEE International Frequency Control Symposium; 1 page; found on the internet at: http://ws680.nist.gov/publication/get_pdf.cfm?pub_id=915857.

Donley, et al. 3: "Number Enhancement for Compact Laser-Cooled Atomic Samples by Use of Stimulated Radiation Forces"; Published Jun. 20, 2010; Proceedings Title: Proc. 2010 Intl. Freq. Cont. Symp. Conference Dates: Jun. 1-4, 2010 Conference Location: Newport Beach, CA; pp. 125-128; found on the internet at: http://ws680.nist.gov/publication/get_pdf.cfm?pub_id=905990.

Donley, et al. 2: "A Cold-Atom Clock Based on Coherent Population Trapping"; Published: Nov. 26, 2012; Proceedings of the 44th Annual PTTI Systems and Applications Meeting, Nov. 26-29, 2012, Reston, VA; pp. 327-334; found on the internet at: http://ws680.nist.gov/publication/get_pdf.cfm?pub_id=912842.

Donley, et al.: "Cancellation of Doppler Shifts in a Cold-Atom CPT Clock"; Proceeding of the 2013 Joint UFFC, EFTF and PMF Symposium; Jul. 21-25, 2013; Prague, -1; 2013 Joint UFFC, EFTF and PMF Symposium; found on the internet at: http://ws680.nist.gov/publication/get_pdf.cfm?pub_id=914284.

Blanshan, et al.: "Light Shifts in a Pulsed Cold-Atom Coherent-Population-Trapping Clock"; Published: Apr. 10, 2015; Phys. Rev. A 91, 041401(R)—Published Apr. 10, 2015; pp. 041401-1 through 041401-6; found on the internet at: https://journals.aps.org/pra/abstract/10.1103/PhysRevA.91.041401.

F-Xesnault, et al., "Cold-atom double-? coherent population trapping clock",Physical Review A, Oct. 2013, vol. 88, Issue 4, pp. 042120-1-042120-5.

Japanese Office Action for Application No. 2019-040494 dated Feb. 12, 2012.

* cited by examiner

ATOMIC CLOCK SYSTEM

RELATED APPLICATIONS

This application claims priority from U.S. patent application Ser. No. 15/722,595, filed 2 Oct. 2017, which claims priority from Provisional Patent Application Ser. No. 62/406,653, filed 11 Oct. 2016, both of which are incorporated herein in their entirety.

TECHNICAL FIELD

The present invention relates generally to timing systems, and specifically to an atomic clock system.

BACKGROUND

Atomic clocks can be implemented as extremely accurate and stable frequency references, such as for use in aerospace applications. As an example, atomic clocks can be used in bistatic radar systems, Global Navigation Satellite systems (GNSS), and other navigation and positioning systems, such as satellite systems. Atomic clocks can also be used in communications systems, such as cellular phone systems. Some cold atom sources can include a magneto-optical trap (MOT). A MOT functions by trapping alkali metal atoms, such as cesium (Cs) or rubidium (Rb), in an atom trapping region, and may be configured such that the atoms are confined to a nominally spherical region of space. As an example, an atomic clock can utilize a cold atom source that traps the alkali metal atoms that can transition between two states in response to optical interrogation to provide frequency monitoring of the optical beam. Thus, the cold atoms can be implemented as a frequency reference, replacing the more typical hot atom beam systems which take up significantly more space for the same performance.

SUMMARY

One embodiment includes an atomic clock system. The system includes a magneto-optical trap (MOT) system that traps alkali metal atoms in a cell during a trapping stage of each of sequential clock measurement cycles. The system also includes an interrogation system that generates an optical difference beam comprising a first optical beam having a first frequency and a second optical beam having a second frequency different from the first frequency. The interrogation system includes a direction controller that periodically alternates a direction of the optical difference beam through the cell during a CPT interrogation stage of each of the sequential clock measurement cycles to drive CPT interrogation of the trapped alkali metal atoms. The system also includes an oscillator system that adjusts a frequency of a local oscillator based on an optical response of the CPT interrogated alkali metal atoms during a state readout stage in each of the sequential clock measurement cycles.

Another embodiment includes a method for stabilizing a local oscillator of an atomic clock system. The method includes trapping alkali metal atoms in a cell associated with a MOT system in response to a trapping magnetic field and a trapping optical beam during a trapping stage of each of sequential clock measurement cycles to provide a source of cold atoms and a baseline optical response of the alkali metal atoms. The method also includes generating an optical difference beam comprising a first optical beam having a first frequency and a second optical beam having a second frequency different from the first frequency. The method also includes periodically alternating a direction of the optical difference beam through the cell during a CPT interrogation stage of each of the sequential clock measurement cycles to drive CPT interrogation of the trapped alkali metal atoms based on relative circular polarizations of the first and second optical beams. The method also includes monitoring an optical response of the CPT interrogated alkali metal atoms during a state readout stage in each of the sequential clock measurement cycles. The method further includes adjusting a frequency of the local oscillator based on the optical response of the CPT interrogated alkali metal atoms of each of the sequential clock measurement cycles relative to the baseline optical response.

Another embodiment includes an atomic clock system. The system includes a MOT system configured to trap alkali metal atoms in a cell during a trapping stage of each of sequential clock measurement cycles to provide a source of cold atoms and a baseline optical response of the alkali metal atoms. The system also includes an interrogation system configured to generate an optical difference beam comprising a first optical beam having a first frequency and a second optical beam having a second frequency different from the first frequency and having a variable relative intensity proportion, the optical difference beam having a frequency that is off-resonance of a frequency associated with a peak corresponding to a maximum excitation of a population of the alkali metal atoms from a first energy state to a second energy state. The interrogation system includes a direction controller configured to periodically alternate a direction of the optical difference beam through the cell during a CPT interrogation stage of each of the sequential clock measurement cycles to drive CPT interrogation of a population of the alkali metal atoms from a first energy state to a second energy state in the presence of a uniform clock magnetic field having an amplitude based on Zeeman-shift characteristics of the alkali metal atoms. The system also includes an oscillator system configured to adjust a frequency of a local oscillator based on an optical response of the CPT interrogated alkali metal atoms relative to the baseline optical response during a state readout stage in each of the sequential clock measurement cycles.

DETAILED DESCRIPTION

Figure 1:
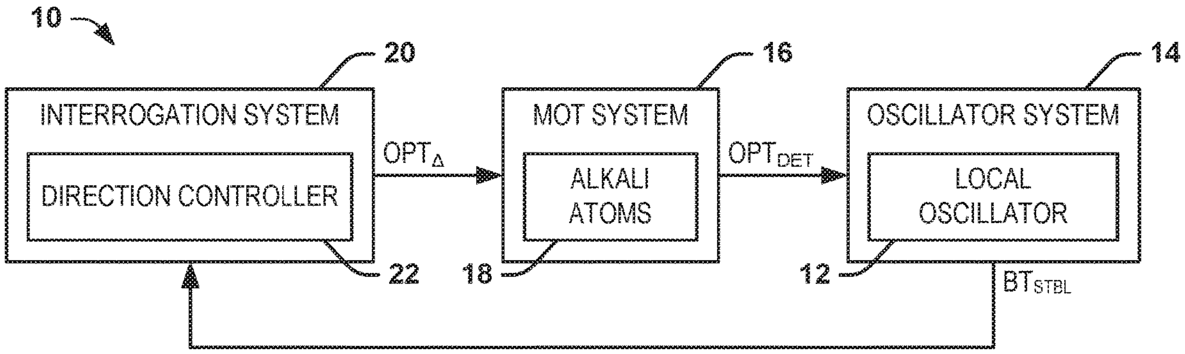
FIG. 1 illustrates an example of an atomic clock system.

The present invention relates generally to timing systems, and specifically to an atomic clock system. The atomic clock system can be implemented to tune a frequency of a local oscillator, such as a crystal oscillator, that provides a stable frequency reference, thereby increasing the stability and accuracy of the local oscillator. For example, the atomic clock system can implement sequential Coherent Population Trapping (CPT) based interrogation cycles to measure the transition energy between two states of a population of alkali metal atoms to obtain a stable frequency reference based on a difference frequency of a difference optical beam that is provided as a collinear beam that includes a first optical beam and a second optical beam of differing frequencies and circular polarizations. The atomic clock system can include a magneto-optical trap (MOT) system that is configured to trap (e.g., cold-trap) alkali metal atoms in response to a trapping magnetic field and a set of trapping optical beams. As an example, during a trapping stage of each of the clock measurement cycles, the MOT system can repeatedly excite the alkali metal atoms to an excited state (e.g., a hyperfine structure of F'=3 for 87-rubidium) on a cycling transition (i.e., F=2, $m_F$=2→F'=3, $m_{F'}$=3, hereafter denoted <2,2>-<3', 3>) to provide a source of cold alkali atoms and a baseline optical response of the alkali metal atoms. Upon trapping the alkali metal atoms to provide a source and the baseline optical response, the MOT system can cease application of the optical trapping beams and the trapping magnetic field to prepare the alkali metal atoms for interrogation.

The atomic clock system can also include an interrogation system. The interrogation system can include a first laser that provides the first optical beam and a second laser that provides the second optical beam, with each of the optical beams having a different frequency and opposite circular polarizations with respect to each other, such that the first and second optical beams are counter-rotating in the difference optical beam. The interrogation system also includes optics and a direction controller that is configured to apply a difference optical beam corresponding to the first and second optical beams provided as a collinear beam having a difference frequency that is provided through a cell of the MOT system in which the alkali metal atoms are contained. The difference optical beam can thus drive a CPT interrogation of a population of the alkali metal atoms followed by a state detection phase to obtain an optical response of the alkali metal atoms based on the difference frequency of the difference optical beam. As another example, the interrogation of the alkali metal atoms can be provided in a uniform clock magnetic field that is associated with the Zeeman-shift characteristics of the alkali metal atoms, such that the CPT interrogation of the alkali metal atoms is from a first energy state to a second energy state in a manner that is substantially insensitive to external magnetic fields. As an example, the alkali metal atoms can be 87-rubidium atoms, such that the uniform clock magnetic field can have a magnitude of approximately 3.23 Gauss such that the CPT interrogation of the rubidium atoms from a first energy state to a second energy state (i.e., F=0, $m_F$=−1→F'=2, $m_{F'}$=1, hereafter denoted <1,−1>-<2,1>) has minimal dependence on variations in magnetic field.

As an example, the optical response of the alkali metal atoms can be obtained over multiple clock measurement cycles to determine a stable frequency reference. For example, the difference frequency can be provided substantially off-resonance from a resonant frequency associated with a substantial maximum CPT of the population of the alkali metal atoms. The off-resonance frequency can be switched from one clock measurement cycle to the next, such as in alternating clock measurement cycles or in a pseudo-random sequence of the clock measurement cycles. As a result, the difference between the optical response of the off-resonance frequency CPT interrogation of the alkali metal atoms in each of a +Δ frequency and a −Δ frequency with respect to the resonant frequency can be determinative of an error shift of the local oscillator as compared to the natural atom resonant frequency. As a result, the error can be applied as an adjustment to the local oscillator. As an example, the local oscillator can be implemented to stabilize the difference frequency between the lasers that provide the first and second optical beams, such that the adjustment to the center frequency of the local oscillator can result in a feedback correction of the difference frequency between the first and second optical beams.

During a CPT interrogation stage of each of the clock measurement cycles, the difference optical beam can be provided in a first direction in a first sequence (e.g., at a first pair of circular polarizations) and in a second direction opposite the first direction in a second sequence (e.g., at a second pair of circular polarizations), with a switching system alternating between the first and second sequences. For example, the switching system can alternate between the first and second sequences at several hundred to a few thousand times during the CPT interrogation stage. As a result, the excitation of the alkali metal atoms can be provided in a manner that rapidly alternates direction. Accordingly, Doppler shifts with respect to the difference frequency can be substantially mitigated in the excitation of the population of the alkali metal atoms. Therefore, the optical response of the alkali metal atoms can be highly accurate with respect to the difference frequency, thus rendering the difference frequency as a highly accurate frequency reference for adjusting the frequency of the local oscillator.

FIG. 1 illustrates an example of an atomic clock system 10. The atomic clock system 10 can be implemented in any of a variety of applications that require a highly stable frequency reference, such as in an inertial navigation system (INS) of an aerospace vehicle. As described in greater detail herein, the atomic clock system 10 can be implemented to adjust a frequency of a local oscillator 12 in an oscillator system 14 based on a sequence of coherent population trapping (CPT) cycles.

The atomic clock system 10 includes an optical trapping system 16 that is configured to trap (e.g., cold-trap) alkali metal atoms 18. As an example, the optical trapping system 16 can be configured as a magneto-optical trap (MOT) system. For example, the alkali metal atoms 18 can be 87-rubidium, but are not limited to 87-rubidium and could instead correspond to a different alkali metal (e.g., 133-cesium). As an example, the optical trapping system 16 includes a cell that confines the alkali metal atoms 18, such that the alkali metal atoms 18 can be trapped in the optical trapping system 16 then further cooled in an "optical molasses" in response to application of an optical trapping beam and application and removal of a trapping magnetic field. For example, each of the sequential clock measurement cycles can include a trapping stage, during which the alkali metal atoms 18 can be trapped by the optical trapping system 16. As an example, during the trapping stage, substantially all of the alkali metal atoms 18 can transition from a ground state (e.g., a hyperfine structure of F=2 in a fine structure of $5^2S_{1/2}$ for 87-rubidium) to an excited state (e.g., a hyperfine structure of F'=3 in a fine structure of $5^2P_{3/2}$ for 87-rubidium) and then back to the ground state in a cycling transition emitting a fluorescence photon with each cycle. In response, the alkali metal atoms 18 can provide an optical response, demonstrated in the example of FIG. 1 as a signal $OPT_{DET}$. The signal $OPT_{DET}$ can correspond to an amplitude of fluorescence of the alkali metal atoms 18, such as resulting from the emission of photons as the alkali metal atoms 18 transition from the excited state back to the ground state. As a result, because substantially all of the alkali metal atoms 18 can be excited and transition back to the ground state during the trapping stage, the signal $OPT_{DET}$ can correspond to a baseline optical response proportional to the total number of trapped atoms during the trapping stage of a given clock measurement cycle. While the optical trapping In each of the clock measurement cycles, subsequent to the trapping stage, a CPT interrogation stage is initiated. In the example of FIG. 1, the atomic clock system 10 includes an interrogation system 20 that is configured to generate a difference optical beam $OPT_{\Delta}$ during the CPT interrogation stage. The difference optical beam $OPT_{\Delta}$ is provided through the optical trapping system 16 (e.g., through the cell of the optical trapping system 16) to drive CPT interrogation of a population of the alkali metal atoms 18. As an example, the difference optical beam $OPT_{\Delta}$ can be generated via a first optical beam (e.g., generated via a first laser) and via a second optical beam (e.g., generated via a second laser) that have differing frequencies. Therefore, the difference optical beam $OPT_{\Delta}$ has a difference frequency that is a difference between the frequency of the first optical beam and the frequency of the second optical beam. As an example, the difference frequency of the difference optical beam $OPT_{\Delta}$ can be approximately 6.8 GHz. The difference optical beam $OPT_{\Delta}$ can thus provide excitation of the population of the alkali metal atoms 18 from a first state (e.g., a ground state <1,−1>) to a second state (e.g., an excited state <2,1>). For example, as described in greater detail herein, the difference frequency can be selected to be slightly off-resonance of a resonant frequency corresponding to a maximum excitation of the alkali metal atoms 18 from the first state to the second state during a CPT interrogation.

The CPT interrogation of the population of the alkali metal atoms 18 via the difference optical beam $OPT_{\Delta}$, followed by the state detection stage, thus obtains an optical response $OPT_{DET}$ of the alkali metal atoms 18 based on the difference frequency of the difference optical beam $OPT_{\Delta}$. Thus, the optical response $OPT_{DET}$ can be provided first during the trapping stage of a given clock measurement cycle in response to the optical trapping of the alkali metal atoms 18, and again during the state detection stage after the CPT interrogation stage in response to excitation of a population of the alkali metal atoms 18 in response to the optical difference beam $OPT_{\Delta}$. As another example, the optical trapping system 16 can also include a uniform clock magnetic field generator configured to generate a uniform clock magnetic field that is applied during the CPT interrogation stage. For example, the uniform clock magnetic field can have a magnitude that is associated with the Zeeman-shift characteristics of the alkali metal atoms 18 to drive CPT interrogation of the population of the alkali metal atoms 18 from a first energy state to a second energy state in manner that is substantially insensitive to external magnetic fields and variations thereof. As an example, the alkali metal atoms can be 87-rubidium atoms, such that the uniform clock magnetic field can have an magnitude of approximately 3.23 Gauss to drive CPT interrogation of the population of the 87-rubidium atoms from a first energy state of <1,−1> to a second energy state of <2,1>.

As an example, the optical response $OPT_{DET}$ of the alkali metal atoms 18 can be obtained over multiple clock measurement cycles to determine a stable frequency reference. In the example of FIG. 1, the optical response $OPT_{DET}$ is provided to the oscillator system 14, such that the oscillator system 14 can adjust the frequency of the local oscillator 12 based on the optical response $OPT_{DET}$ over multiple sequential clock measurement cycles. For example, the difference frequency of the difference optical beam $OPT_{\Delta}$ can be provided substantially off-resonance from a resonant frequency associated with a substantial maximum CPT of the population of the alkali metal atoms 18 and to a point of increased or maximum rate of change in the CPT response to changes in the difference frequency. The off-resonance frequency can be switched substantially equally and oppositely from the resonant frequency from one clock measurement cycle to the next, such as in alternating clock measurement cycles or in a pseudo-random sequence of the clock measurement cycles. As a result, the difference between the optical response $OPT_{DET}$ of the off-resonance frequency excitation of the alkali metal atoms 18 in each of a +Δ frequency and a −Δ frequency with respect to the resonant frequency can be determinative of an error of the resonant frequency, such as resulting from a drift of the stable frequency reference of the local oscillator 12. As a result, the error can be applied as an adjustment to the frequency of the local oscillator 12. As an example, the local oscillator 12 can be implemented to stabilize the difference frequency between the first and second lasers that provide the first and second optical beams that generate the difference optical beam $OPT_{\Delta}$. In the example of FIG. 1, the oscillator system 14 provides a frequency stabilization signal $BT_{STBL}$ to the interrogation system 20 to adjust the frequency of the respective lasers therein, and thus the difference optical beam $OPT_{\Delta}$. Accordingly, the adjustment to the center frequency of the local oscillator 12 can result in a feedback correction of the difference frequency of the difference optical beam $OPT_{\Delta}$.

In addition, in the example of FIG. 1, the interrogation system 20 also includes a direction controller 22 that is configured to apply the difference optical beam $OPT_{\Delta}$ through the optical trapping system 16 (e.g., through the cell of the optical trapping system 16) in each of a first direction in a first sequence (e.g., at a first circular polarization configuration) and in a second direction opposite the first direction in a second sequence (e.g., at a second circular polarization configuration). For example, the direction controller 22 can alternate between the first and second sequences at several hundred to a few thousand times (e.g., 1-100 kHz) during the CPT interrogation stage. As a result, the excitation of the alkali metal atoms 18 can be provided in a manner that rapidly alternates direction. For example, the alkali metal atoms 18 can be excited only in response to a given circular polarization configuration of the difference optical beam $OPT_{\Delta}$, such that the given circular polarization configuration of the difference optical beam $OPT_{\Delta}$ can alternate between the first direction and the second direction in each of the first and second sequences, respectively. Accordingly, Doppler shifts with respect to the difference frequency of the difference optical beam $OPT_{\Delta}$ can be substantially mitigated in the CPT interrogation of the energy state transition of the population of the alkali metal atoms 18. Therefore, the optical response $OPT_{DET}$ of the alkali metal atoms $OPT_{\Delta}$ can be highly accurate with respect to the difference frequency of the difference optical beam $OPT_{\Delta}$, thus rendering the difference frequency as a highly accurate frequency reference for adjusting the frequency of the local oscillator 12.

Figure 2:
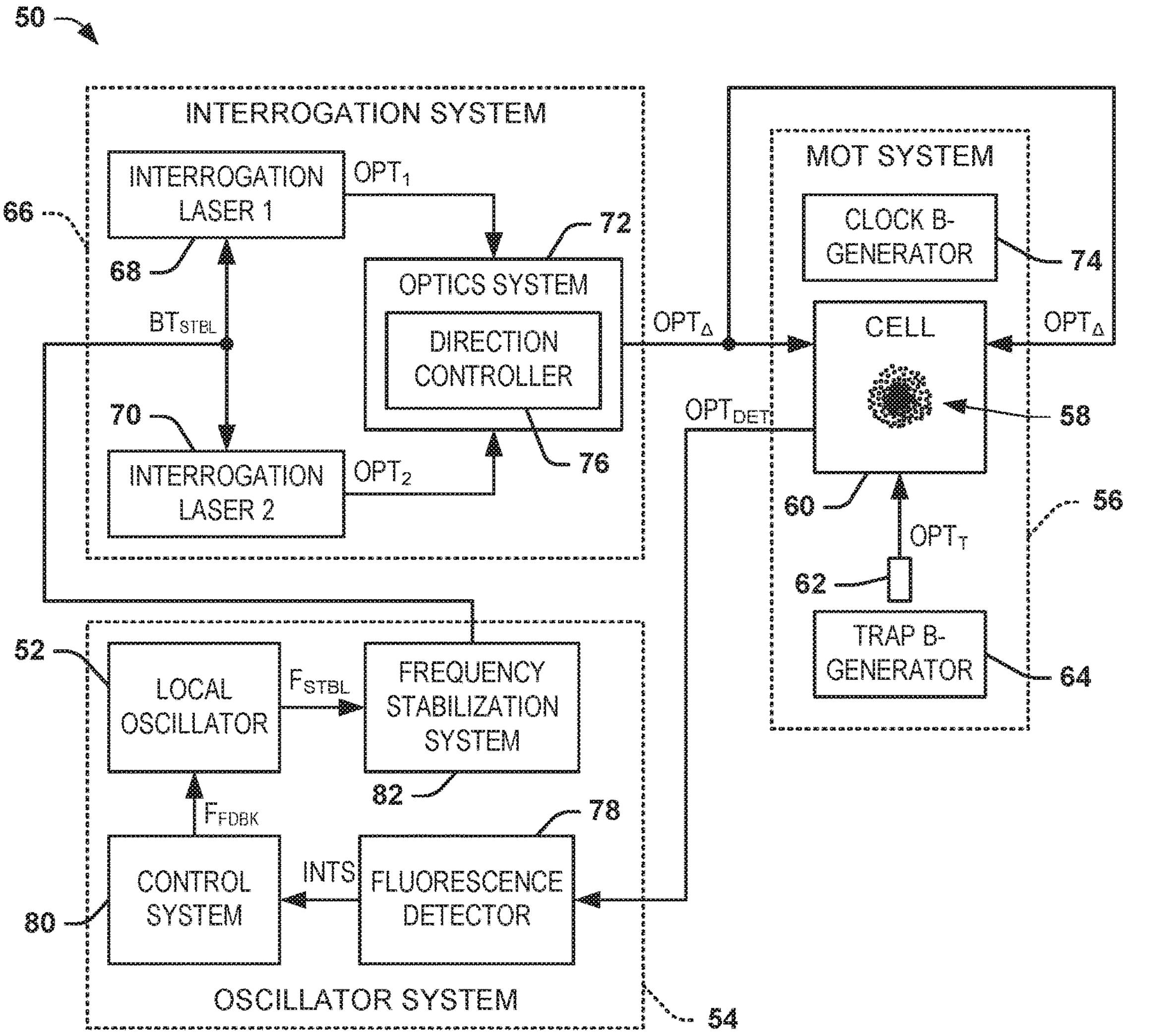
FIG. 2 illustrates another example of an atomic clock system.

FIG. 2 illustrates another example of an atomic clock system 50. The atomic clock system 50 can be implemented to adjust a frequency of a local oscillator 52 in an oscillator system 54 based on a sequence of clock measurement cycles.

The atomic clock system 50 includes an MOT system 56 that is configured to trap (e.g., cold-trap) alkali metal atoms 58. In the example of FIG. 2, the alkali metal atoms 58 are confined in a cell 60 that can be formed from transparent glass that substantially mitigates optical losses. For example, the alkali metal atoms 58 can be 87-rubidium. The MOT system 56 also includes a trapping laser 62 that is configured to generate an optical trapping beam $OPT_T$ and a trapping magnetic field generator 64 ("CLOCK B-GENERATOR") that is configured to generate a trapping magnetic field. Each of the sequential clock measurement cycles can begin with a trapping stage, during which the alkali metal atoms 58 can be trapped by the MOT system 56 via the optical trapping beam $OPT_T$ and the trapping magnetic field. While the atomic clock system 50 is demonstrated as including an optical trapping system configured as an MOT, it is to be understood that other methods of trapping the alkali metal atoms 58 can be implemented in the atomic clock system 50.

During the trapping stage, substantially all of the alkali metal atoms 58 can transition from a ground state (e.g., a hyperfine structure of F=2 in a fine structure of $5^2S_{1/2}$ for 87-rubidium) to an excited state (e.g., a hyperfine structure of F'=3 in a fine structure of $5^2P_{3/2}$ for 87-rubidium), then back to a ground state (e.g., a hyperfine structure of F=2 in a fine structure of $5^2S_{1/2}$ for 87-rubidium) in a cycling transition. If, through an off-resonant Raman transition, an alkali atom should fall into the lower ground state (e.g., a hyperfine structure of F=1 in the fine structure of $5^2S_{1/2}$ for 87-rubidium), part of the trapping light can be tuned to re-pump the lower ground state atoms back into the cycling transition for cooling and trapping, as described herein. As an example, a majority of the alkali metal atoms 58 can be excited in response to the trapping magnetic field and the optical trapping beam, and can receive additional stimulus to provide for substantially the entirety of the alkali metal atoms 58 to transition to the excited state, as described in greater detail herein. In response to the excitation and return to ground state, the alkali metal atoms 58 can provide an optical response, demonstrated in the example of FIG. 2 as a signal $OPT_{DET}$. The signal $OPT_{DET}$ can correspond to an amplitude of fluorescence of the alkali metal atoms 58, such as resulting from the emission of photons as the alkali metal atoms 58 transition from the excited state back to the ground state. As a result, because substantially all of the alkali metal atoms 58 can be excited and transition back to the ground state during the trapping stage, the signal $OPT_{DET}$ can correspond to a baseline optical response during the trapping stage of a given clock measurement cycle. While the MOT system 56 is described herein as providing the optical response based on spontaneous decay of the excited alkali metal atoms 58, it is to be understood that other ways to facilitate trapping of the alkali metal atoms 58 to obtain a baseline optical response can be implemented. For example, the MOT system 56 can instead drive an excitation-stimulated emission cycle, which can be driven faster and can exert greater cooling force on the alkali metal atoms 58.

Subsequent to the trapping stage, the MOT system 56 can provide an optical molasses state of the given clock measurement cycle. As an example, during the optical molasses state, the MOT system 56 can deactivate the trapping magnetic field generator 64, and thus cease application of the trapping magnetic field while maintaining the optical trapping beam $OPT_T$. As a result, the alkali metal atoms 58 can be significantly cooled (e.g., to approximately 5 μK) to provide greater confinement of the alkali metal atoms 58. Accordingly, the alkali metal atoms 58 can have significantly less velocity upon being released during a subsequent CPT interrogation stage of the clock measurement cycle.

The atomic clock system 50 also includes an interrogation system 66. The CPT interrogation stage includes a first laser 68 that is configured to generate a first optical beam $OPT_1$ and a second laser 70 that is configured to generate a second optical beam $OPT_2$. The first and second optical beams $OPT_1$ and $OPT_2$ are provided to an optics system 72 that is configured to combine the first and second optical beams $OPT_1$ and $OPT_2$ to provide a difference optical beam $OPT_\Delta$. The difference optical beam $OPT_\Delta$ is provided through the cell 60 of the MOT system 56 to drive CPT interrogation of a population of the alkali metal atoms 58 during a CPT interrogation stage of the given clock measurement cycle. As an example, the first optical beam $OPT_1$ can be generated by the first laser 68 to have a first frequency and the second optical beam $OPT_2$ can be generated by the second laser 70 to have a second frequency that is different from the first frequency. Therefore, the difference optical beam $OPT_\Delta$ has a difference frequency that is a difference between the frequencies of the first and second optical beams $OPT_1$ and $OPT_2$. As an example, the difference frequency of the difference optical beam $OPT_\Delta$ can be approximately 6.8 GHz. The difference optical beam $OPT_\Delta$ can thus provide excitation of the population of the alkali metal atoms 58 from a first state (e.g., a ground state <1,−1>) to a second state (e.g., an excited state <2,1>). For example, as described in greater detail herein, the difference frequency can be selected to be slightly off-resonance of an optical resonant frequency corresponding to a maximum excitation of the alkali metal atoms 58 from the first state to the second state.

As described herein, the term "population" with respect to the alkali metal atoms 58 describes a portion of less than all of the alkali metal atoms 58, and particularly less than the substantial entirety of the alkali metal atoms 58 that are excited during the trapping stage. As an example, during the CPT interrogation stage, the alkali metal atoms 58 are excited to an energy state that is close to a stable excited state (e.g., <1',0> via one of the first and second optical beams $OTP_1$ and $OPT_2$, and are then excited to the stable state (e.g., <2,1>) via the other of the first and second optical beams $OPT_1$ and $OPT_2$. The portion of the alkali metal atoms 58 that are excited to the final stable state can depend on the relative frequency of the first and second optical beams $OPT_1$ and $OPT_2$ (e.g., the difference frequency) during application of a pulse of the difference optical beam $OPT_\Delta$. However, a portion of the alkali metal atoms 58 remain in a "dark state", and do not settle to the final stable state (e.g., <2,1>) during the CPT interrogation stage. The alkali metal atoms 58 that remain in the dark state thus constitute the remainder of the alkali metal atoms 58 that are not in the population of the alkali metal atoms 58 that are excited to the final stable state during the CPT interrogation stage.

As described in greater detail herein, the excitation of the population of the alkali metal atoms 58 via the difference optical beam $OPT_\Delta$ thus obtains an optical response $OPT_{DET}$ of the alkali metal atoms 58 based on the difference frequency of the difference optical beam $OPT_\Delta$ (e.g., during a readout stage of the respective clock measurement cycle). Additionally, as described previously, the alkali metal atoms 58 can receive additional stimulus during the trapping stage to provide for substantially the entirety of the alkali metal atoms 58 to transition to the excited state. As an example, one of the first and second optical beams $OPT_1$ and $OPT_2$ can be provided to the cell 60 during the trapping stage to provide the additional stimulus to provide excitation of substantially all of the alkali metal atoms 58 to provide the source of the cold atoms and the baseline optical response $OPT_{DET}$.

In addition, in the example of FIG. 2, the MOT system 56 includes a uniform clock magnetic field generator ("TRANSITION B-GENERATOR") 74. The uniform clock magnetic field generator 74 can be configured to provide a uniform clock magnetic field through the cell 60 during the CPT interrogation stage to provide the excitation of the population of the alkali metal atoms 58 in a manner that is substantially insensitive to external magnetic fields. As an example, the uniform clock magnetic field can have a magnitude that is associated with the Zeeman-shift characteristics of the alkali metal atoms 58 to drive CPT interrogation of the population of the alkali metal atoms 58 from the first energy state to the second energy state. For example, the alkali metal atoms can be 87-rubidium atoms, such that the uniform clock magnetic field can have an magnitude of approximately 3.23 Gauss to drive CPT interrogation of the population of the 87-rubidium atoms from the first energy state of <1,−1> to the second energy state of <2,1>.

As an example, during the CPT interrogation stage, the first and second optical beams $OPT_1$ and $OPT_2$ can be provided at a variable intensity with respect to each other. Thus, the difference optical beam $OPT_\Delta$ can have an intensity that is a proportion of the varying intensities of the first and second optical beams $OPT_1$ and $OPT_2$ during the CPT interrogation stage. As an example, the one of the first and second optical beams $OPT_1$ and $OPT_2$ can have an intensity that increases from zero in an adiabatic increase until reaching a peak, at which time the intensity of the other of the first and second optical beams $OPT_1$ and $OPT_2$ begins to increase from zero adiabatically. The given one of the first and second optical beams $OPT_1$ and $OPT_2$ can thus begin to decrease adiabatically first, followed by the other of the first and second optical beams $OPT_1$ and $OPT_2$. Based on the proportion of the intensity of the first and second optical beams $OPT_1$ and $OPT_2$ in the difference optical beam $OPT_\Delta$, the excitation of the population of the alkali metal atoms 58 from the first state to the second state can be provided in a manner that substantially mitigates deleterious AC stark shifts.

In addition, the alkali metal atoms 58 can be sensitive only to a given circular polarization orientation of the difference optical beam $OPT_\Delta$ (e.g., at circular polarizations $+\sigma$ and $-\sigma$ with respect to the optical beams $OPT_1$ and $OPT_2$, respectively) and insensitive to an opposite circular polarization direction (e.g., at circular polarizations $-\sigma$ and $+\sigma$ with respect to the optical beams $OPT_1$ and $OPT_2$, respectively). As a result, repeated excitation of the alkali metal atoms 58 in a given one direction can provide an increase in momentum of the alkali metal atoms 58 in that given direction. As a result, the momentum of the alkali metal atoms 58 in the given direction can cause a Doppler shift with respect to the optical response $OPT_{DET}$ at the difference frequency in the given direction. Such a Doppler shift with respect to the optical response $OPT_{DET}$ can result in an error of the optical response $OPT_{DET}$, and thus an error in a resultant frequency reference with respect to the crystal oscillator 52, as described in greater detail herein.

In the example of FIG. 2, the difference optical beam $OPT_\Delta$ is provided through the cell 60 in both a first direction and a second direction opposite the first direction via a direction controller 76 that is associated with the interrogation system 66. As an example, the direction controller 76 can be configured to periodically reverse the direction of application of the difference optical beam $OPT_\Delta$ through the cell 60 with respect to the first and second directions multiple times throughout the CPT interrogation stage of the given clock measurement cycle. Thus, the direction controller 76 can provide the optical difference beam $OPT_\Delta$ through the cell 60 in the first direction during a first sequence, followed by providing the optical difference beam $OPT_\Delta$ through the cell 60 in the second direction during a second sequence, and can alternate between the first and second sequences rapidly (e.g., approximately 1-100 kHz) during the CPT interrogation stage.

As an example, the difference optical beam $OPT_\Delta$ can include the first and second optical beams $OPT_1$ and $OPT_2$ being provided in opposite orientations of circular polarization (e.g., $+\sigma$ and $-\sigma$, respectively). Thus, the direction controller 76 can provide the $+\sigma$ circular polarization in each of the opposite directions to alternately provide the excitation of the alkali metal atoms 58 in each of the opposite directions. Accordingly, the Doppler shift with respect to the difference frequency of the difference optical beam $OPT_\Delta$ can be substantially mitigated in the excitation of the population of the alkali metal atoms 58. For example, by providing the excitation of the alkali metal atoms 58 in each of the opposite directions in a rapid manner during the CPT interrogation stage of each of the clock measurement cycles, the momentum of the alkali metal atoms 58 in response to the difference optical beam $OPT_\Delta$ being provided in a given direction is substantially cancelled by a substantially equal and opposite momentum provided by the difference optical beam $OPT_\Delta$ being provided in the opposite direction to substantially mitigate any potential Doppler shift in the optical response $OPT_{DET}$.

Figure 3:
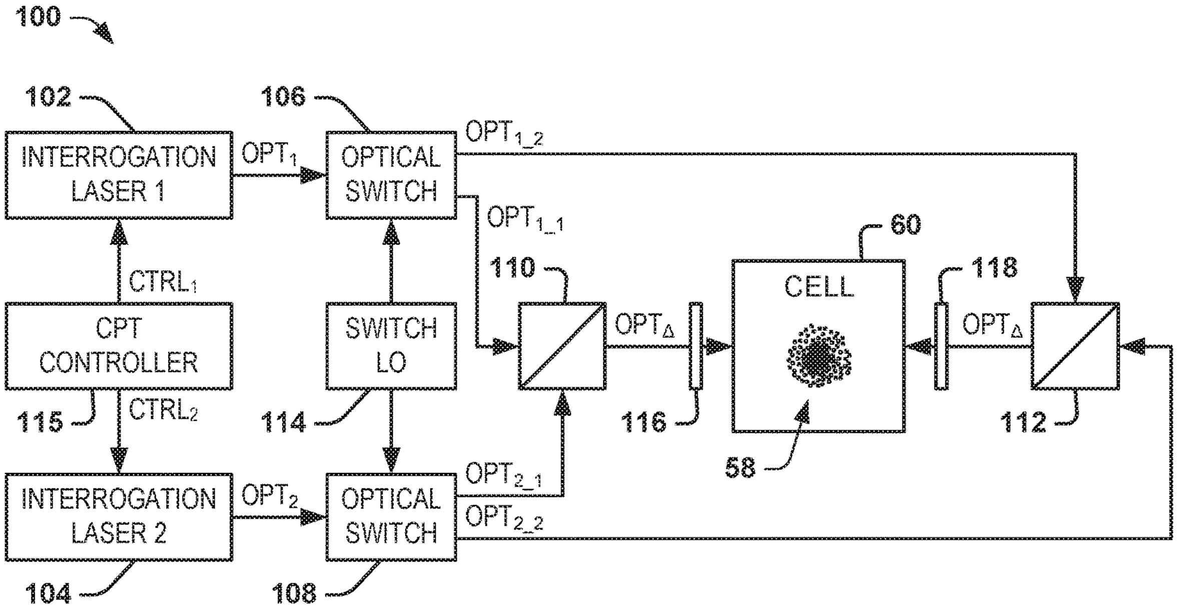
FIG. 3 illustrates an example of an interrogation system.

FIG. 3 illustrates an example of an interrogation system 100. The interrogation system 100 can correspond to a first example of the interrogation system 66. Thus, reference is to be made to the example of FIG. 2 in the following description of the example of FIG. 3.

The interrogation system 100 includes a first laser 102 that is configured to generate a first optical beam $OPT_1$ and a second laser 104 that is configured to generate a second optical beam $OPT_2$. The first optical beam $OPT_1$ is provided to an optical switch 106, and the second optical beam $OPT_2$ is provided to an optical switch 108. The optical switches 106 and 108 are each configured to switch the respective first and second optical beams $OPT_1$ and $OPT_2$ between a first polarizing beam-combiner 110 and a second polarizing beam-combiner 112, respectively, in response to a switching local oscillator ("SWITCH LO") 114. As an example, the switching local oscillator 114 can be controlled by the local oscillator 52 to concurrently switch the outputs of each of the optical switches 106 and 108 at a substantially high frequency to provide switching at approximately hundreds to thousands of times during the CPT interrogation stage.

In the example of FIG. 3, the interrogation system 100 also includes a CPT controller 115 that is configured to provide a first control signal $CTRL_1$ to the first laser 102 and a second control signal $CTRL_2$ to the second laser 104. As an example, the control signals $CTRL_1$ and $CTRL_2$ can be implemented to provide a variable intensity of the respective first and second optical beams $OPT_1$ and $OPT_2$ with respect to each other. Thus, the difference optical beam $OPT_\Delta$ can have an intensity that is a proportion of the varying intensities of the first and second optical beams $OPT_1$ and $OPT_2$ during the CPT interrogation stage, as described in greater detail herein. Based on the proportion of the intensity of the first and second optical beams $OPT_1$ and $OPT_2$ in the difference optical beam $OPT_\Delta$, the excitation of the population of the alkali metal atoms 58 from the first state to the second state can be provided in a manner that substantially mitigates deleterious AC stark shifts.

As an example, during a first sequence, the switching local oscillator 114 can command the optical switch 106 to provide the first optical signal $OPT_1$ as an output optical signal $OPT_{1\_1}$ that is provided to the first polarizing beam-combiner 110. Similarly, during the first sequence, the switching local oscillator 114 can command the optical switch 108 to provide the second optical signal $OPT_2$ as an output optical signal $OPT_{2\_1}$ that is likewise provided to the first polarizing beam-combiner 110. As an example, the optical beams $OPT_{1\_1}$ and $OPT_{2\_1}$ can each be linearly polarized with orthogonal linear polarizations relative to each other. Therefore, the first polarizing beam-combiner 110 can provide the difference optical beam $OPT_\Delta$ as a single beam having the respective orthogonal linearly polarized optical beams $OPT_{1\_1}$ and $OPT_{2\_1}$. The difference optical beam $OPT_\Delta$ is provided through a variable wave plate (e.g., a quarter-wave plate) 116 to provide the difference optical beam $OPT_\Delta$ as a single beam having respective opposite circularly-polarized optical beams $OPT_{1\_1}$ and $OPT_{2\_1}$ (e.g., at counter-rotating circular polarizations $+\sigma$ and $-\sigma$). The circularly-polarized difference optical beam $OPT_\Delta$ is thus provided through the cell 60 in the first direction during the first sequence.

Similarly, during a second sequence, the switching local oscillator 114 can command the optical switch 106 to provide the first optical signal $OPT_1$ as an output optical signal $OPT_{1\_2}$ that is provided to the second polarizing beam-combiner 112. Likewise, during the second sequence, the switching local oscillator 114 can command the optical switch 108 to provide the second optical signal $OPT_2$ as an output optical signal $OPT_{2\_2}$ that is likewise provided to the second polarizing beam-combiner 112. As an example, the optical beams $OPT_{1\_2}$ and $OPT_{2\_2}$ can each be linearly polarized with orthogonal linear polarizations relative to each other. Therefore, the second polarizing beam-combiner 112 can provide the difference optical beam $OPT_\Delta$ as a single beam having the respective orthogonal linearly polarized optical beams $OPT_{1\_2}$ and $OPT_{2\_2}$. The difference optical beam $OPT_\Delta$ is provided through a variable wave plate (e.g., a quarter-wave plate) 118 to provide the difference optical beam $OPT_\Delta$ as a single beam having respective opposite circularly-polarized optical beams $OPT_{1\_2}$ and $OPT_{2\_2}$ (e.g., at counter-rotating circular polarizations $+\sigma$ and $-\sigma$). The circularly-polarized difference optical beam $OPT_\Delta$ is thus provided through the cell 60 in the second direction opposite the first direction during the second sequence. Accordingly, by rapidly switching between the first sequence and the second sequence, the difference optical beam $OPT_\Delta$ can be rapidly and alternately provided through the cell 60 to drive CPT interrogation of the alkali metal atoms 58 in each of the first and second directions (e.g., at circular polarizations $+\sigma$ and $-\sigma$ with respect to the optical beams $OPT_1$ and $OPT_2$, respectively, in each of the first and second sequences) during the CPT interrogation stage.

In the example of FIG. 3, the optical switches 106 and 108 can be physically positioned in such a manner as to ensure that the phase of the optical signals $OPT_1$ and $OPT_2$, and thus the optical beams $OPT_{1\_1}$ and $OPT_{1\_2}$ and the optical beams $OPT_{2\_1}$ and $OPT_{2\_2}$, is approximately equal with respect to an approximate center of the cell 60 corresponding to a CPT interrogation region. As a result, the CPT interrogation of the alkali metal atoms 58 can be approximately equal with respect to each of the first and second sequence based on the difference optical beam $OPT_\Delta$ having an approximately equal phase in each of the first and second sequences. For example, the optical switches 106 and 108 can be physically positioned such that the path length of the optical signals $OPT_1$ and $OPT_2$ are approximately equal with respect to the separate respective directions of application of the difference optical beam $OPT_\Delta$ through the cell 60, or have a path length that is different by an integer number of an equivalent microwave wavelength corresponding to the difference frequency of the two optical beams $OPT_1$ and $OPT_2$ (e.g., approximately 4.4 cm for 87-rubidium). Accordingly, the phase of the difference optical beam $OPT_\Delta$ can be approximately equal with respect to the CPT interrogation of the alkali metal atoms 58 in each of the first and second sequence.

Figure 4:
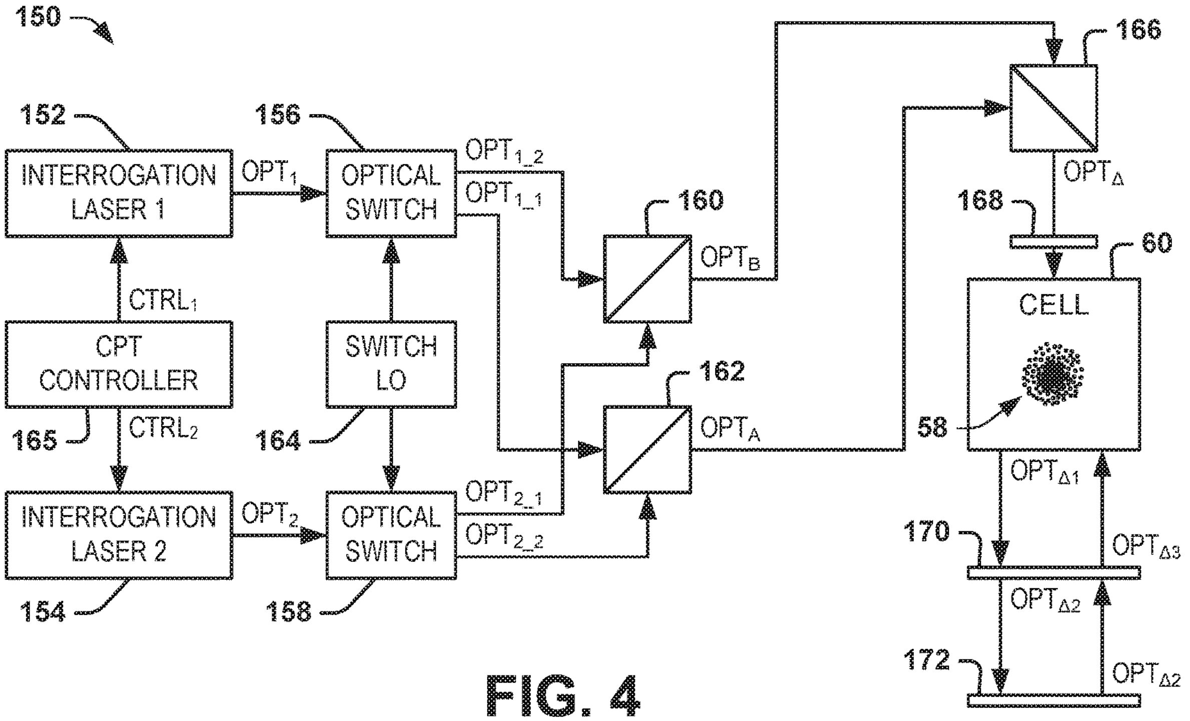
FIG. 4 illustrates another example of an interrogation system.

FIG. 4 illustrates another example of an interrogation system 150. The interrogation system 150 can correspond to a second example of the interrogation system 66. Thus, reference is to be made to the example of FIG. 2 in the following description of the example of FIG. 4.

The interrogation system 150 includes a first laser 152 that is configured to generate a first optical beam $OPT_1$ and a second laser 154 that is configured to generate a second optical beam $OPT_2$. The first optical beam $OPT_1$ is provided to an optical switch 156, and the second optical beam $OPT_2$ is provided to an optical switch 158. The optical switches 156 and 158 are each configured to switch the respective first and second optical beams $OPT_1$ and $OPT_2$ between a first polarizing beam-combiner 160 and a second polarizing beam-combiner 162, respectively, in response to a switching local oscillator ("SWITCH LO") 164. As an example, the switching local oscillator 164 can be controlled by the local oscillator 52 to concurrently switch the outputs of each of the optical switches 156 and 158 at a substantially high frequency to provide switching at approximately hundreds to thousands of times during the CPT interrogation stage.

In the example of FIG. 4, the interrogation system 150 also includes a CPT controller 165 that is configured to provide a first control signal $CTRL_1$ to the first laser 152 and a second control signal $CTRL_2$ to the second laser 154. As an example, the control signals $CTRL_1$ and $CTRL_2$ can be implemented to provide a variable intensity of the respective first and second optical beams $OPT_1$ and $OPT_2$ with respect to each other. Thus, the difference optical beam $OPT_\Delta$ can have an intensity that is a proportion of the varying intensities of the first and second optical beams $OPT_1$ and $OPT_2$ during the CPT interrogation stage, as described in greater detail herein. Based on the proportion of the intensity of the first and second optical beams $OPT_1$ and $OPT_2$ in the difference optical beam $OPT_\Delta$, the excitation of the population of the alkali metal atoms 58 from the first state to the second state can be provided in a manner that substantially mitigates deleterious AC stark shifts.

As an example, during a first sequence, the switching local oscillator 164 can command the optical switch 156 to provide the first optical signal $OPT_1$ as an output optical signal $OPT_{1\_1}$ that is provided to the first polarizing beam-combiner 160. Similarly, during the first sequence, the switching local oscillator 164 can command the optical switch 158 to provide the second optical signal $OPT_2$ as an output optical signal $OPT_{2\_1}$ that is likewise provided to the second polarizing beam-combiner 162. As an example, the optical beams $OPT_{1\_1}$ and $OPT_{2\_1}$ can each be linearly polarized with orthogonal linear polarizations relative to each other. Therefore, the first polarizing beam-combiner 160 can provide an optical beam $OPT_\Delta$ corresponding to the first optical beam $OPT_1$ (e.g., the optical beam $OPT_{1\_1}$) during the first sequence and the second polarizing beam-combiner 162 can provide an optical beam $OPT_B$ corresponding to the second optical beam $OPT_2$ (e.g., the optical beam $OPT_{2\_1}$) during the first sequence. The optical beams $OPT_\Delta$ and $OPT_B$ thus have orthogonal linear polarizations relative to each other, and are provided to a third polarizing beam-combiner 166 to provide the difference optical beam $OPT_\Delta$ as a single beam having the respective orthogonal linearly polarized optical beams $OPT_\Delta$ and $OPT_B$ (e.g., the optical beams $OPT_{1\_1}$ and $OPT_{2\_1}$). The difference optical beam $OPT_\Delta$ is provided through a variable wave plate (e.g., a quarter-wave plate) 168 to provide the difference optical beam $OPT_\Delta$ as a single beam having respective opposite circularly-polarized optical beams $OPT_\Delta$ and $OPT_B$ (e.g., at counter-rotating circular polarizations $+\sigma$ and $-\sigma$ with respect to the optical beams $OPT_1$ and $OPT_2$, respectively) during the first sequence.

Similarly, during a second sequence, the switching local oscillator 164 can command the optical switch 156 to provide the first optical signal $OPT_1$ as an output optical signal $OPT_{1\_2}$ that is provided to the second polarizing beam-combiner 162. Likewise, during the second sequence, the switching local oscillator 164 can command the optical switch 158 to provide the second optical signal $OPT_2$ as an output optical signal $OPT_{2\_2}$ that is likewise provided to the first polarizing beam-combiner 160. As an example, the optical beams $OPT_{1\_2}$ and $OPT_{2\_2}$ can each be linearly polarized with orthogonal linear polarizations relative to each other. Therefore, the first polarizing beam-combiner 160 can provide the optical beam $OPT_\Delta$ corresponding to the second optical beam $OPT_2$ (e.g., the optical beam $OPT_{2\_2}$) during the second sequence and the second polarizing beam-combiner 162 can provide the optical beam $OPT_B$ corresponding to the first optical beam $OPT_1$ (e.g., the optical beam $OPT_{1\_2}$) during the second sequence. The optical beams $OPT_\Delta$ and $OPT_B$ thus have orthogonal linear polarizations relative to each other, and are provided to the third polarizing beam-combiner 166 to provide the difference optical beam $OPT_\Delta$ as the single beam having the respective orthogonal linearly polarized optical beams $OPT_\Delta$ and $OPT_B$ (e.g., the optical beams $OPT_{1\_2}$ and $OPT_{2\_2}$). The difference optical beam $OPT_\Delta$ is provided through the variable wave plate 168 to provide the difference optical beam $OPT_\Delta$ as a single beam having respective opposite circularly-polarized optical beams $OPT_\Delta$ and $OPT_B$ (e.g., at counter-rotating circular polarizations $-\sigma$ and $+\sigma$ with respect to the optical beams $OPT_1$ and $OPT_2$, respectively) during the second sequence. Therefore, the circular polarizations of the respective first and second optical beams $OPT_1$ and $OPT_2$ are reversed in the second sequence relative to the first sequence.

In each of the first and second sequences, the difference optical beam $OPT_\Delta$ is provided through the cell 60 from the variable wave plate 168. The difference optical beam $OPT_\Delta$ passes through the cell 60 and exits as a difference optical beam $OPT_{\Delta 1}$ through a variable wave plate (e.g., a quarter-wave plate) 170 to provide a difference optical beam $OPT_{\Delta 2}$. The difference optical beam $OPT_{\Delta 2}$ is thus converted to a single beam that includes the respective orthogonally-linearly polarized first and second optical beams $OPT_\Delta$ and $OPT_B$ in response to the variable wave plate 170. The difference optical beam $OPT_{\Delta 2}$ is reflected by a mirror 172 and is provided to the variable wave plate 170 that converts the orthogonally-linearly polarized optical beams $OPT_\Delta$ and $OPT_B$ of the difference optical beam $OPT_{\Delta 2}$ back to respective opposite circular polarizations to provide a difference optical beam $OPT_{\Delta 3}$. However, based on the reflection by the mirror 172, the circular polarizations of the difference optical beam $OPT_{\Delta 3}$ are reversed relative to the circular polarizations of the difference optical beam $OPT_{\Delta 1}$. For example, in the first sequence, the difference optical beam $OPT_\Delta$, and thus $OPT_{\Delta 1}$, can have circular polarizations $+\sigma$ and $-\sigma$ with respect to the optical beams $OPT_1$ and $OPT_2$, respectively. Thus, the difference optical beam $OPT_{\Delta 3}$ can have the opposite relative circular polarizations $-\sigma$ and $+\sigma$ with respect to the optical beams $OPT_1$ and $OPT_2$, respectively, during the first sequence. Similarly, in the second sequence, the difference optical beam $OPT_\Delta$, and thus $OPT_{\Delta 1}$, can have circular polarizations $-\sigma$ and $+\sigma$ with respect to the optical beams $OPT_1$ and $OPT_2$, respectively. Thus, the difference optical beam $OPT_{\Delta 3}$ can have the opposite relative circular polarizations $+\sigma$ and $-\sigma$ with respect to the optical beams $OPT_1$ and $OPT_2$, respectively, during the second sequence.

As described previously, the alkali metal atoms 58 can be sensitive only to a given circular polarization orientation of the difference optical beam $OPT_\Delta$ (e.g., at circular polarizations $+\sigma$ and $-\sigma$ with respect to the optical beams $OPT_1$ and $OPT_2$, respectively) and insensitive to an opposite circular polarization direction (e.g., at circular polarizations $-\sigma$ and $+\sigma$ with respect to the optical beams $OPT_1$ and $OPT_2$, respectively). Therefore, during the first sequence, the optical difference beam $OPT_\Delta$ can be provided from the variable wave plate 168 through the cell 60 in the first direction as having circular polarizations $+\sigma$ and $-\sigma$ with respect to the optical beams $OPT_1$ and $OPT_2$, respectively. At the same time, the optical difference beam $OPT_{\Delta 3}$ can be provided from the variable wave plate 170 through the cell 60 in the second direction as having circular polarizations $-\sigma$ and $+\sigma$ with respect to the optical beams $OPT_1$ and $OPT_2$, respectively. Therefore, the alkali metal atoms 58 can be excited in response to the optical difference beam $OPT_\Delta$ provided in the first direction and insensitive to the optical difference beam $OPT_{\Delta 3}$ provided in the second direction opposite the first direction during the first sequence.

Alternatively, during the second sequence, the optical difference beam $OPT_\Delta$ can be provided from the variable wave plate 168 through the cell 60 in the first direction as having circular polarizations $-\sigma$ and $+\sigma$ with respect to the optical beams $OPT_1$ and $OPT_2$, respectively. At the same time, the optical difference beam $OPT_{\Delta 3}$ can be provided from the variable wave plate 170 through the cell 60 in the second direction as having circular polarizations $+\sigma$ and $-\sigma$ with respect to the optical beams $OPT_1$ and $OPT_2$, respectively. Therefore, the alkali metal atoms 58 can be excited in response to the optical difference beam $OPT_{\Delta 3}$ provided in the second direction and insensitive to the optical difference beam $OPT_\Delta$ provided in the first direction opposite the second direction during the second sequence. Accordingly, by rapidly switching between the first sequence and the second sequence, the difference optical beam $OPT_\Delta$ can be rapidly and alternately provided through the cell 60 to drive CPT interrogation of the alkali metal atoms 58 in each of the first and second directions at circular polarizations $+\sigma$ and $-\sigma$ with respect to the optical beams $OPT_1$ and $OPT_2$, respectively, in each of the first and second sequences, during the CPT interrogation stage.

In the example of FIG. 4, the mirror 172 can be physically positioned in such a manner as to ensure that the phase of the optical signals $OPT_1$ and $OPT_2$, and thus the phase of the difference optical beam $OPT_\Delta$, is approximately equal with respect to an approximate center of the cell 60 corresponding to a CPT interrogation region. As a result, the CPT interrogation of the alkali metal atoms 58 can be approximately equal with respect to each of the first and second sequence based on the difference optical beam $OPT_\Delta$ having an approximately equal phase in each of the first and second sequences. For example, the mirror 172 can be physically positioned such that a distance from the approximate center of the cell 60 corresponding to a CPT interrogation region is approximately equal to one-half of an integer number of an equivalent microwave wavelength corresponding to the difference frequency of the two optical beams OPT$_1$ and OPT$_2$ (e.g., approximately 4.4 cm for 87-rubidium). Accordingly, the phase of the difference optical beam OPT$_\Delta$ can be approximately equal with respect to the CPT interrogation of the alkali metal atoms 58 in each of the first and second sequence.

Referring back to the example of FIG. 2, the optical response OPT$_{DET}$ is provided to a fluorescence detector 78 of the oscillator system 54. The fluorescence detector 78 is configured to monitor an intensity of the optical response OPT$_{DET}$ in each of the trapping stage and the CPT interrogation stage of the given clock measurement cycle. For example, the fluorescence detector 78 can monitor the baseline optical response OPT$_{DET}$ of the alkali metal atoms 58 in response to the excitation of the alkali metal atoms 58 by the trapping magnetic field and the optical trapping beam OPT$_T$ during the trapping stage, and can monitor the optical response OPT$_{DET}$ of the alkali metal atoms 58 in response to the excitation of a population of the alkali metal atoms 58 by the difference optical beam OPT$_\Delta$ during the CPT interrogation stage. The fluorescence detector 78 is configured to generate an intensity signal INTS in response to the optical response OPT$_{DET}$, such that the intensity signal INTS can have an amplitude that corresponds to the intensity of the optical response OPT$_{DET}$.

The intensity signal INTS is provided to a control system 80 that can be configured as a processor or application specific integrated circuit (ASIC). The control system 80 can be configured to compare the intensity signal INTS in each of the trapping stage and the CPT interrogation stage. Therefore, the control system 80 can compare the optical response OPT$_{DET}$ of the excited alkali metal atoms 58 during the CPT interrogation stage relative to the baseline optical response OPT$_{DET}$ provided during the trapping stage. As an example, the control system 80 can perform the comparison at the conclusion of each clock measurement cycle and can thus determine a frequency shift in the frequency of the local oscillator 52 over the course of multiple clock measurement cycles.

In the example of FIG. 2, the oscillator system 54 also includes a frequency stabilization system 82 that is configured to provide a frequency stabilization signal BT$_{STBL}$ to each of the first and second interrogation lasers 68 and 70 to set and stabilize the difference frequency between the first and second optical beams OPT$_1$ and OPT$_2$. In the example of FIG. 2, the frequency stabilization system 82 is configured to stabilize the difference frequency between the first and second optical beams OPT$_1$ and OPT$_2$ in response to a stable frequency reference F$_{STBL}$ provided from the local oscillator 52. As an example, the frequency stabilization system 82 can include a master laser (not shown) that is stabilized by the stable frequency reference F$_{STBL}$, and the frequency stabilization system 82 can stabilize the difference frequency between the first laser 68 and the second laser 70 based on a beat stabilization system that compares a frequency of the first and second optical beams OPT$_1$ and OPT$_2$, respectively, with the frequency of the master laser. Thus, the frequency stabilization signal BT$_{STBL}$ can correspond to a beat stabilization feedback to provide stabilization of the first and second lasers 68 and 70, and thus the first and second optical beams OPT$_1$ and OPT$_2$, respectively.

As an example, in each of the clock measurement cycles, the frequency stabilization system 82 can be configured to adjust the amplitude of the difference frequency based on the frequency stabilization signal BT$_{STBL}$. For example, the frequency stabilization system 82 can be configured to adjust the frequency of one of the first and second optical beams OPT$_1$ and OPT$_2$ while maintaining the frequency of the other of the first and second optical beams OPT$_1$ and OPT$_2$. Therefore, in each of the clock measurement cycles, the difference frequency of the difference optical beam OPT$_\Delta$ can be off-resonance from a resonant frequency corresponding to maximum excitation of the alkali metal atoms 58 from the first state (e.g., <1,−1>) to the second state (e.g., <2,1>). As an example, the off-resonance frequency can be switched substantially equally and oppositely from the resonant frequency from one clock measurement cycle to the next, such as in alternating clock measurement cycles, or can be switched in a pseudo-random sequence of the respective clock measurement cycles. As a result, the difference between the optical response OPT$_{DET}$ of the off-resonance frequency excitation of the alkali metal atoms 58 in each of a first off-resonance frequency +Δ and a second off-resonance frequency −Δ with respect to the resonant frequency can be determinative of an error of the resonant frequency, such as resulting from a drift of the stable frequency reference of the local oscillator 52.

Figure 5:
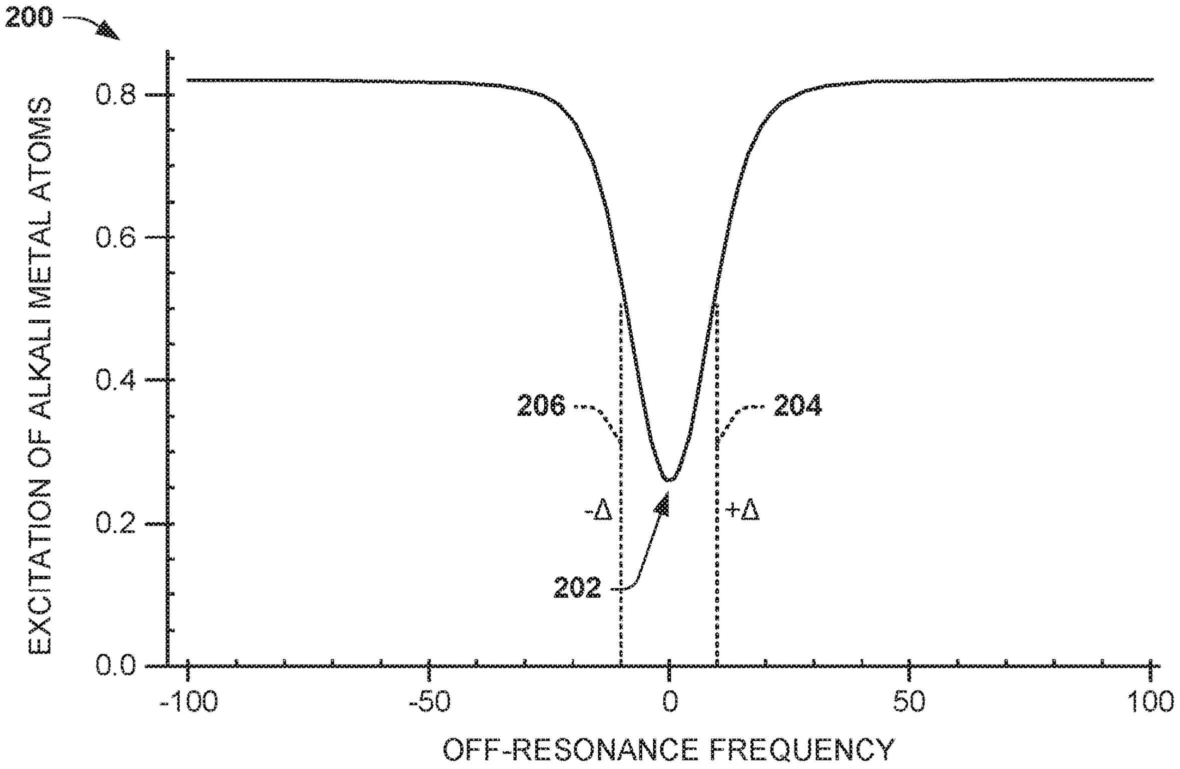
FIG. 5 illustrates an example of a graph of alkali metal excitation and Coherent Population Trapping (CPT).

FIG. 5 illustrates an example of a graph 200 of alkali metal excitation. The graph 200 demonstrates an off-resonance frequency on the X-axis, in Hz, relative to a predetermined resonant frequency corresponding to an expected substantial maximum excitation of the alkali metal atoms 58 from the first state to the second state. Accordingly, the predetermined resonant frequency corresponds to a frequency setting of the frequency stabilization system 82 with respect to the difference optical beam OPT$_\Delta$.

In the example of FIG. 5, the alkali metal atoms 58 can correspond to 87-rubidium atoms, and the maximum excitation of the 87-rubidium atoms 58 is demonstrated as an inverted peak 202 that is centered at an off-resonance frequency of zero. The Y-axis demonstrates a proportion of the 87-rubidium atoms 58 that are not excited from the first state to the second state (e.g., to the hyperfine F=2 state) in response to a clock measurement cycle in the CPT interrogation stage, as demonstrated in greater detail herein (e.g., based on the timing diagram 250 in the example of FIG. 6). The proportion (e.g., percentage) of the 87-rubidium atoms 58 that are not excited can thus affect the optical response OPT$_{DET}$ during the CPT interrogation stage, such that lower proportions of the 87-rubidium atoms 58 that are not excited results in a greater intensity of the optical response OPT$_{DET}$. Thus, in the following description of the example of FIG. 5, reference is to be made to the example of FIG. 2.

The graph 200 thus demonstrates that the excitation of the alkali metal atoms 58 (e.g., 87-rubidium atoms) has a very narrow linewidth. The graph 200 also demonstrates a first off-resonant frequency 204 and a second off-resonant frequency 206, demonstrated as respective dotted lines. In the example of FIG. 5, the first off-resonant frequency 204 is demonstrated as a +Δ off-resonant frequency (e.g., plus approximately 20 Hz relative to the resonant frequency at the off-resonance of 0 Hz), and the second off-resonant frequency 206 is demonstrated as a −Δ off-resonant frequency (e.g., minus approximately 20 Hz relative to the resonant frequency at the off-resonance of 0 Hz). At the resonant frequency at the off-resonance of 0 Hz, the graph demonstrates that approximately 25% of the alkali metal atoms 58 are not excited to the second state during the CPT interrogation stage. At each direction of off-resonance shifting of the off-resonance frequency relative to the inverted peak 202, the percentage of the alkali metal atoms 58 that are not excited increases in a sharply linear manner, achieving an approximately flat (e.g., asymptotic) characteristic at approximately 30 Hz and −30 Hz, respectively. In the example of FIG. 5, the first off-resonant frequency 204 and a second off-resonant frequency 206 are each equal and opposite the inverted peak 202, and thus correspond to approximately 50% of the alkali metal atoms 58 are not excited to the second state during the CPT interrogation stage.

As an example, the frequency stabilization system 82 can be configured to set the difference frequency of the difference optical beam $OPT_{\Delta}$ to one of the first off-resonant frequency 204 and the second off-resonant frequency 206 during the CPT interrogation stage of each of the clock measurement cycles. For example, the frequency stabilization system 82 can adjust the frequency of one of the first and second optical beams $OPT_1$ and $OPT_2$ while maintaining the frequency of the other of the first and second optical beams $OPT_1$ and $OPT_2$. Therefore, in each of the clock measurement cycles, the difference frequency of the difference optical beam $OPT_{\Delta}$ can be off-resonance from the resonant frequency inverted peak 202 by +Δ or −Δ in each of the clock measurement cycles. Because the first and second off-resonance frequencies 204 and 206 each correspond to high-slope regions of the graph 200, small drifts of the graph 200 from the first and second off-resonance frequencies 204 and 206 can result in significant changes in the percentage of the 87-rubidium atoms 58 that are not excited by the difference optical beam $OPT_{\Delta}$. Therefore, the optical response $OPT_{DET}$ can be significantly different between the difference optical beam $OPT_{\Delta}$ being provided at the first off-resonance frequency 204 relative to the second off-resonance frequency 206, as demonstrated in the example of FIG. 6.

Figure 6:
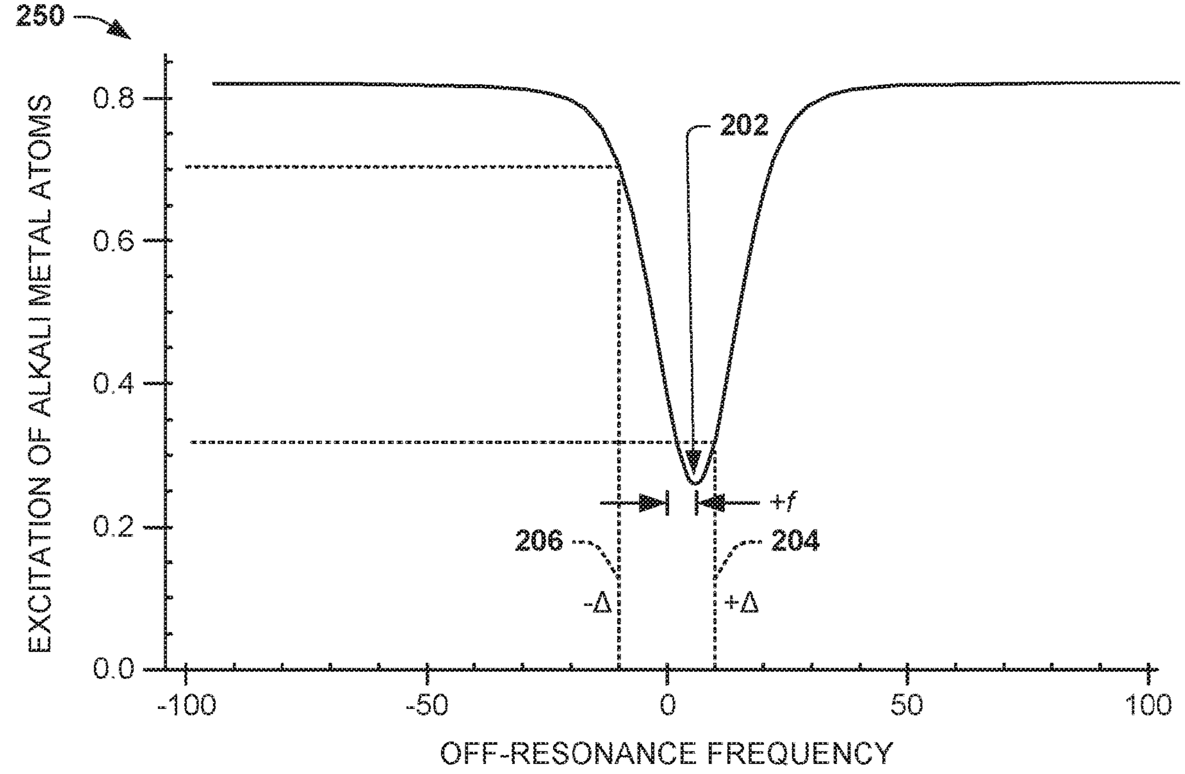
FIG. 6 illustrates another example of a graph of the alkali metal excitation and CPT.

FIG. 6 illustrates another example of a graph 250 of the alkali metal excitation. The graph 250 corresponds to the graph 200 in the example of FIG. 5. However, in the example of FIG. 6, the predetermined resonant frequency setting of the frequency stabilization system 82 is demonstrated as having drifted by a frequency amplitude of +f. Therefore, the actual resonant frequency corresponding to the actual substantial maximum excitation of the alkali metal atoms 58 from the first state to the second state is shifted by approximately 5 Hz. Based on the frequency drift, the first and second off-resonant frequencies 204 and 206 provide significantly different excitation of the population (e.g., proportion) of the 87-rubidium atoms 58. Particularly, in the example of FIG. 6, the first off-resonance frequency +Δ provides an approximate 32% of the 87-rubidium atoms not being excited to the second state, and the second off-resonance frequency −Δ provides an approximate 70% of the 87-rubidium atoms not being excited to the second state. Therefore, a given clock measurement cycle in which the difference optical frequency of the difference optical beam $OPT_{\Delta}$ is provided at the first off-resonance frequency +Δ provides a significantly different optical response $OPT_{DET}$ relative to the optical response of another clock measurement cycle in which the difference optical beam $OPT_{\Delta}$ is provided at the difference frequency of the off-resonance frequency −Δ. Accordingly, the fluorescence detector 78 can measure the difference in intensity of each of the optical responses of the respective clock measurement cycles.

Referring back to the example of FIG. 2, in response to measuring the optical response $OPT_{DET}$ of a first clock measurement cycle corresponding to a difference frequency of the first off-resonance frequency +Δ and to measuring the optical response $OPT_{DET}$ of a second clock measurement cycle corresponding to a difference frequency of the second off-resonance frequency −Δ, the control system 80 is configured to compare a difference in intensity of the optical responses $OPT_{DET}$ (e.g., based on the respective intensity signals INTS). In response to detecting a difference in the intensity of the optical responses $OPT_{DET}$ in each of the respective clock measurement cycles, the control system 80 can detect a drift in the actual resonant frequency of the alkali metal atoms 58. Accordingly, the control system 80 can provide a frequency feedback signal $F_{FDBK}$ to the local oscillator 52. As a result, the local oscillator 52 can adjust the respective stable frequency reference $F_{STBL}$. Because the frequency stabilization system 82 is configured to stabilize the difference frequency between the first and second lasers 68 and 70, and thus the respective first and second optical beams $OPT_1$ and $OPT_2$, based on the stable frequency reference $F_{STBL}$, the difference frequency of the difference optical beam $OPT_{\Delta}$ can thus be adjusted in a feedback manner. Accordingly, the interrogation of the alkali metal atoms 58 over a sequence of clock measurement cycles can provide for a very accurate stabilization of the stable frequency reference $F_{STBL}$ that is output from the local oscillator 52.

Figure 7:
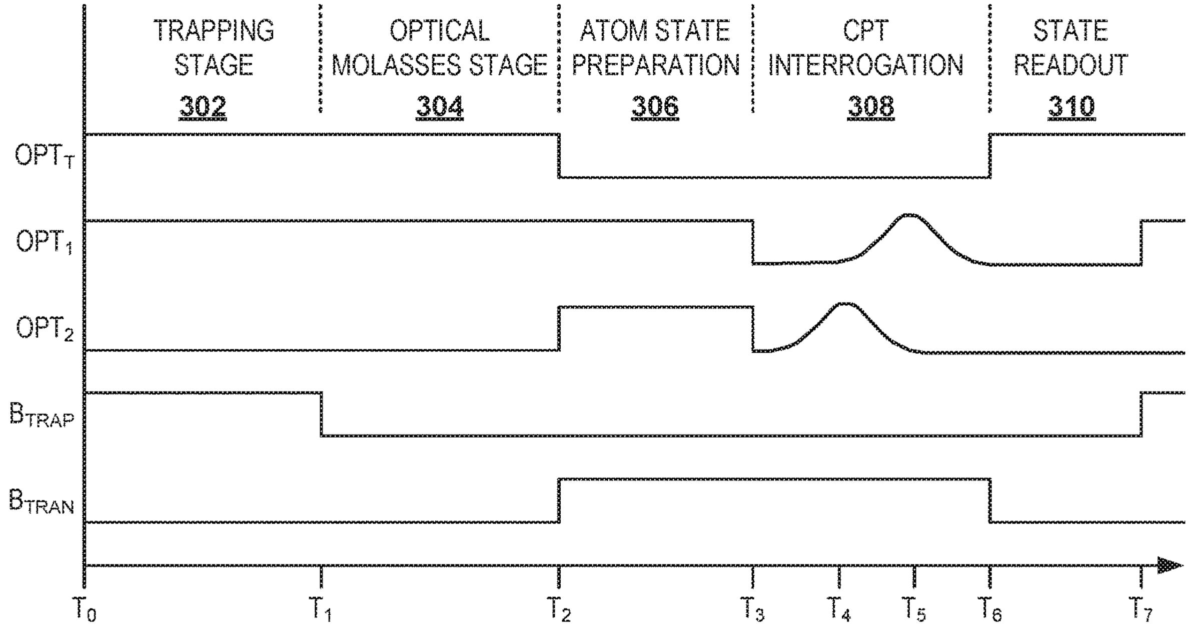
FIG. 7 illustrates an example of a timing diagram.

FIG. 7 illustrates an example of a timing diagram 300. The timing diagram 300 corresponds to the timing of each clock measurement cycle with respect to the signals and timing that define the given clock measurement cycle. Reference is to be made to the examples of FIGS. 1-6 in the following description of the example of FIG. 7.

The timing diagram 300 demonstrates the separate stages of each of the clock measurement cycles. It is to be understood that the stages are not demonstrated as scaled with respect to each other. Beginning at a time $T_0$, the clock measurement cycle begins with the trapping stage 302. At the time $T_0$, the optical trapping beam $OPT_T$ is provided through the cell 60, as well as the trapping magnetic field $B_{TRAP}$ provided from the trapping magnetic field generator 64. In addition, as described previously, the alkali metal atoms 58 may receive additional stimulus to ensure excitation of the substantially the entirety of the alkali metal atom population. Therefore, in the example of FIG. 7, the first optical beam $OPT_1$ is also provided through the cell 60 to provide excitation of at least a portion of the alkali metal atoms 58 from F=0 to F=1, thus allowing the optical trapping beam $OPT_T$ to provide excitation of the at least a portion of the alkali metal atoms 58 to be excited from F=1 to F=2'. As an example, the trapping stage 302 can have a duration of approximately 50 milliseconds. At the conclusion of the trapping stage 302, in response to the alkali metal atoms 58 emitting photons upon returning to the ground state, the atomic clock system 50 can obtain a source of the cold alkali atoms and a baseline optical response $OPT_{DET}$ of the alkali metal atoms 58.

At a time $T_1$, the clock measurement cycle transitions to an optical molasses stage 304. At the time $T_1$, the optical trapping beam $OPT_T$ is maintained through the cell 60, as well as the first optical beam $OPT_1$, but the trapping magnetic field $B_{TRAP}$ is deactivated. As a result, the optical trapping beam $OPT_T$ can provide further cooling of the alkali metal atoms 58. For example, the alkali metal atoms 58 can reduce in temperature to near absolute zero (e.g., approximately 5 μK), such that the alkali metal atoms 58 can greatly reduce in diffusion velocity (e.g., a few centimeters per second). As a result, the alkali metal atoms 58 can be substantially contained in preparation for interrogation. As an example, the optical molasses stage 304 can have a duration of approximately 25 ms.

At a time $T_2$, the clock measurement cycle transitions to an atom state preparation stage 306. At the time $T_2$, the optical trapping beam $OPT_T$ is deactivated, and the second optical beam $OPT_2$ while the first optical beam $OPT_1$ is maintained. In addition, the uniform clock magnetic field $B_{TRAN}$, as provided by the uniform clock magnetic field generator 74, is activated at the time $T_2$. Thus, the atom state preparation stage 306 sets the conditions to begin an interrogation during the given clock measurement cycle. As an example, the atom state preparation stage 306 can have a duration of approximately 2 ms.

At a time $T_3$, a CPT interrogation stage 308 begins. The CPT interrogation stage 308 corresponds to the CPT interrogation stage during which the difference optical beam is alternately and rapidly provided through the cell 60 in the first and second directions, as described in greater detail herein. During the CPT interrogation stage 308, the first and second optical beams $OPT_1$ and $OPT_2$ are demonstrated as being provided at a variable intensity with respect to each other. In the example of FIG. 7, beginning at the time $T_3$, the second optical beam $OPT_2$ begins to increase adiabatically in intensity until reaching an amplitude peak at a time $T_4$. Beginning at the time $T_4$, the second optical beam $OPT_2$ begins to decrease adiabatically, and concurrently beginning at the time $T_4$, the first optical beam $OPT_1$ begins to increase adiabatically. At a time $T_5$, the first optical beam $OPT_1$ reaches a peak, and the second optical beam $OPT_2$ decreases in intensity to approximately zero. After the time $T_5$, the first optical beam $OPT_1$ decreases in intensity, and decreases in intensity to approximately zero at a time $T_6$. As an example, the CPT interrogation stage 308 can have a duration of approximately 20 ms. Based on the proportion of the intensity of the first and second optical beams $OPT_1$ and $OPT_2$ in the difference optical beam $OPT_\Delta$, the excitation of the population of the alkali metal atoms 58 from the first state to the second state can be provided in a manner that substantially mitigates deleterious AC stark shifts.

At a time $T_6$, the clock measurement cycle transitions to a state readout stage 310. At the time $T_6$, the optical trapping beam $OPT_T$ is reactivated, and the uniform clock magnetic field $B_{TRAN}$ is deactivated. During the state readout stage 310, the population of the alkali metal atoms 58 have transitioned from the first state (e.g., the state <1,−1>) to the second state (e.g., the state <2,1>), such that the population of the alkali metal atoms 58 provide an optical response $OPT_{DET}$ during the state readout stage 310. Accordingly, the oscillator system 54 can control the frequency of the local oscillator 52 based on the optical response $OPT_{DET}$ (e.g., based on the optical response $OPT_{DET}$ over a sequence of clock measurement cycles), as described herein. As an example, the state readout stage 310 can have a duration of approximately 3 ms.

Figure 8:
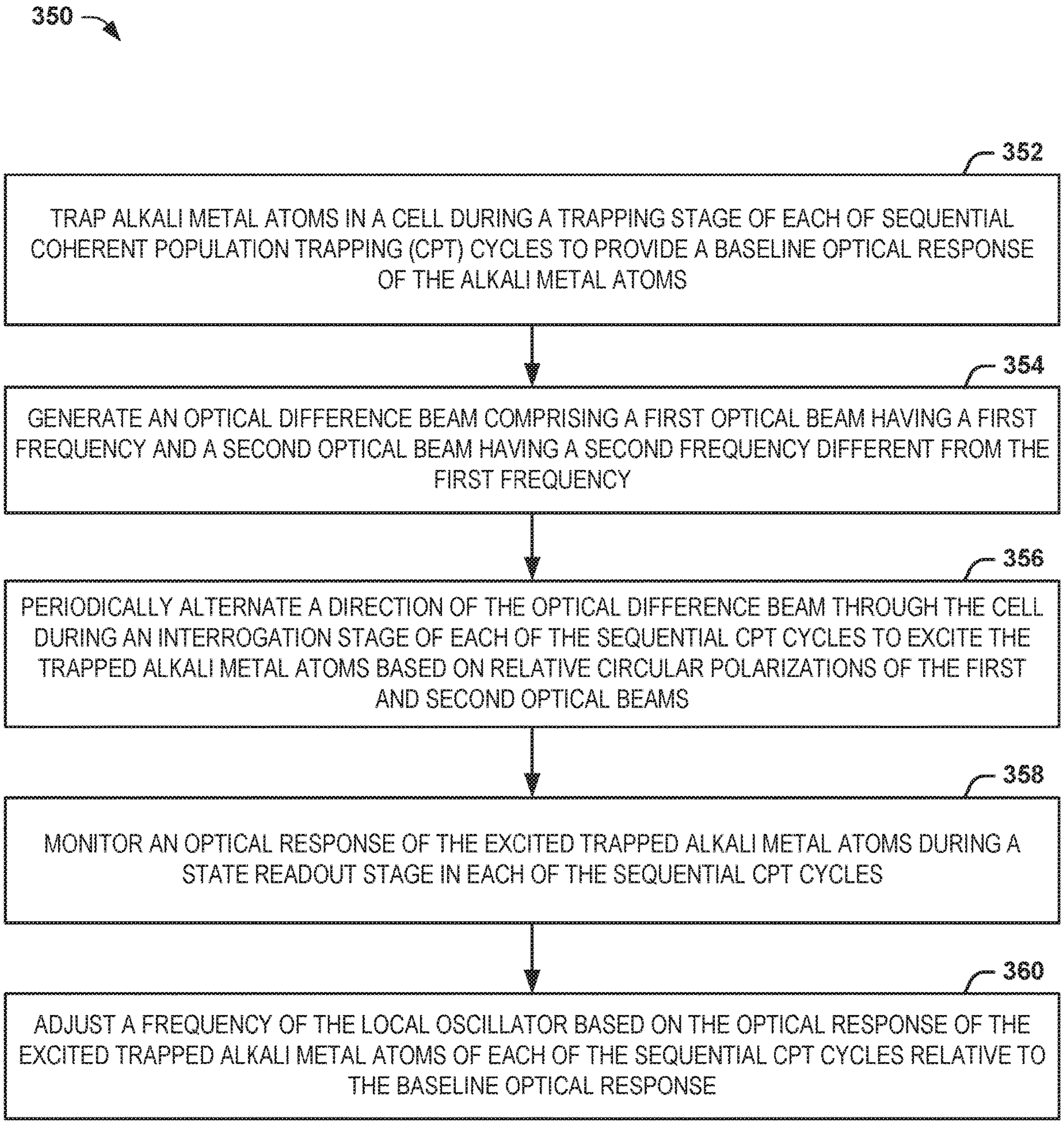
FIG. 8 illustrates an example of a method for stabilizing a local oscillator of an atomic clock system.

In view of the foregoing structural and functional features described above, a methodology in accordance with various aspects of the present invention will be better appreciated with reference to FIG. 8. While, for purposes of simplicity of explanation, the methodology of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 8 illustrates an example of a method 350 for stabilizing a local oscillator (e.g., the local oscillator 12) of an atomic clock system (e.g., the atomic clock system 10). At 352, alkali metal atoms (e.g., the alkali metal atoms 18) are trapped in a cell (e.g., the cell 60) during a trapping stage (e.g., the trapping stage 302) of each of sequential coherent population trapping (CPT) cycles to provide a source of the cold alkali atoms and a baseline optical response (e.g., the baseline optical response $OPT_{DET}$) of the alkali metal atoms. At 354, an optical difference beam (e.g., the difference optical beam $OPT_\Delta$) comprising a first optical beam (e.g., the first optical beam $OPT_1$) having a first frequency and a second optical beam (e.g., the second optical beam $OPT_2$) having a second frequency different from the first frequency is generated. At 356, a direction of the optical difference beam is periodically alternated through the cell during a CPT interrogation stage (e.g., the CPT interrogation stage 308) of each of the sequential clock measurement cycles to drive CPT interrogation of the trapped alkali metal atoms based on alternating relative circular polarizations of the first and second optical beams. At 358, an optical response (e.g., the optical response $OPT_{DET}$) of the CPT interrogated alkali metal atoms is monitored during a state readout stage (e.g., the state readout stage 310) in each of the sequential clock measurement cycles. At 360, a frequency of the local oscillator is adjusted based on the optical response of the CPT interrogated alkali metal atoms of each of the sequential clock measurement cycles relative to the baseline optical response.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An atomic clock system comprising:

an optical trapping system that traps alkali metal atoms in a cell during a trapping stage of each of sequential clock measurement cycles;

an interrogation system that generates an optical difference beam to drive coherent population trapping (CPT) interrogation of the alkali metal atoms, the optical difference beam comprising a first optical beam having a first frequency and a second optical beam having a second frequency different from the first frequency; and an oscillator system that adjusts a frequency of a local oscillator based on an optical response of the CPT interrogated alkali metal atoms in response to the optical difference beam.

2. The system of claim 1, the interrogation system comprising a direction controller that periodically alternates a direction of the optical difference beam through the cell during a CPT interrogation stage of each of the sequential clock measurement cycles.

3. The system of claim 2, wherein the oscillator system adjusts the frequency of the local oscillator based on the optical response of the CPT interrogated alkali metal atoms in response to the optical difference beam during a state readout stage of each of the sequential clock measurement cycles.

4. The system of claim 2, wherein the optical trapping system is configured as a magneto-optical trapping (MOT) system comprises:

a first magnetic field generator configured to generate a trapping magnetic field configured to trap the alkali metal atoms in the cell in response to an optical trapping beam; and a second magnetic field generator configured to generate a uniform clock magnetic field during the CPT interrogation stage of the sequential clock measurement cycles, the uniform clock magnetic field having an amplitude based on Zeeman-shift characteristics of the alkali metal atoms to drive CPT interrogation of a population of the alkali metal atoms from a first energy state to a second energy state.

5. The system of claim 4, wherein the alkali metal atoms are 87-rubidium atoms, and wherein the uniform clock magnetic field has a magnitude of approximately 3.23 Gauss to drive CPT interrogation of the population of the 87-rubidium atoms from a first energy state of <1,−1> to a second energy state of <2,1>.

6. The system of claim 4, wherein the first optical beam is provided through the cell along with the optical trapping beam during the trapping stage to excite substantially all of the alkali metal atoms to provide a source of the cold alkali atoms and a baseline optical response of the alkali metal atoms, wherein the oscillator system adjusts the frequency of the local oscillator based on the optical response of the CPT interrogated alkali metal atoms relative to the baseline optical response of the alkali metal atoms during the state readout stage in each of the sequential clock measurement cycles.

7. The system of claim 2, wherein the interrogation system is configured to control an intensity of each of the first optical beam and the second optical beam during the CPT interrogation stage to provide a variable relative intensity proportion to mitigate AC Stark shift associated with the excitation of the alkali metal atoms.

8. The system of claim 1, wherein the direction controller comprises:

a first beam combiner configured to receive the first and second optical beams to provide the optical difference beam in a first direction through the cell in a first sequence;

a second beam combiner configured to receive the first and second optical beams to provide the optical difference beam in a second direction through the cell opposite the first direction in a second sequence; and optical switches configured to alternate between the first sequence and the second sequence.

9. The system of claim 8, wherein the first beam combiner is configured to combine the first and second optical beams to provide the optical difference beam through a first variable wave plate and through the cell in the first direction at a first relative circular polarization in the first sequence, and wherein the second beam combiner is configured to combine the first and second optical beams to provide the optical difference beam through a second variable wave plate and through the cell in the second direction at a second relative circular polarization in the second sequence.

10. The system of claim 9, wherein a path length of the first and second optical beams are approximately equal with respect to the separate respective first and second directions of application of the optical difference beam through the cell, or the path length of the first and second optical beams is different by an integer number of an equivalent microwave wavelength corresponding to a difference frequency of the first and second optical beams.

11. The system of claim 8, wherein the first beam combiner receives the first and second optical beams to provide one of the first optical beam and the second optical beam at a first linear polarization in the first sequence and the second sequence, respectively, wherein the second beam combiner receives the first and second optical beams to provide one of the second optical beam and the first optical beam at a second linear polarization in the first sequence and the second sequence, respectively, the system further comprising:

a third beam combiner configured to combine the first and second optical beams to provide the optical difference beam through a first variable wave plate in each of the first and second sequences to provide the optical difference beam in each of a first relative circular polarization and a second relative circular polarization, respectively, in a first direction through the cell in the first sequence and the second sequence, respectively; and a reflection system comprising a mirror and a second variable wave plate configured to reflect the optical difference beam in the second direction through the cell in each of the first and second sequences to provide the optical difference beam in each of the second relative circular polarization and the first relative circular polarization, respectively in the first sequence and the second sequence, respectively.

12. The system of claim 11, wherein the mirror is physically positioned such that a distance from the approximate center of the cell corresponding to a CPT interrogation region of the alkali metal atoms is approximately equal to one-half of an integer number of an equivalent microwave wavelength corresponding to a difference frequency of the first and second optical beams.

13. The system of claim 1, wherein a frequency of the first optical beam and a frequency of the second optical beam are set to provide the optical difference beam at a difference frequency that is off-resonance of an on-resonance frequency associated with a peak corresponding to a maximum excitation of a population of the alkali metal atoms from a first energy state to a second energy state.

14. The system of claim 13, wherein the difference frequency is adjusted to be one of $+\Delta$ and $-\Delta$ of the on-resonance frequency in each of the sequential clock measurement cycles to determine a difference intensity associated with the optical response of the CPT interrogated alkali metal atoms during the state readout stage in the sequential clock measurement cycles.

15. The system of claim 1, wherein the frequency of the local oscillator is a frequency reference, and the local oscillator provides the frequency reference to a frequency stabilization system that stabilizes a difference frequency between each of the first and second optical beams, such that the oscillator system adjusts the frequency reference of the local oscillator in a feedback manner.

16. A method for stabilizing a local oscillator of an atomic clock system, the method comprising:

trapping alkali metal atoms in a cell during a trapping stage of each of sequential clock measurement cycles to provide a source of cold alkali atoms and a baseline optical response of the alkali metal atoms;

generating an optical difference beam comprising a first optical beam having a first frequency and a second optical beam having a second frequency different from the first frequency;

providing the optical difference beam through the cell during a coherent population trapping (CPT) interrogation stage of each of the sequential clock measurement cycles to drive CPT interrogation of the trapped alkali metal atoms;

monitoring an optical response of the CPT interrogated alkali metal atoms during a state readout stage in each of the sequential clock measurement cycles; and adjusting a frequency of the local oscillator based on the optical response of the CPT interrogated alkali metal atoms of each of the sequential clock measurement cycles relative to the baseline optical response.

17. The method of claim 16, wherein providing the optical difference beam comprises periodically alternating a direction of the optical difference beam through the cell during the CPT interrogation stage of each of the sequential clock measurement cycles to drive the CPT interrogation of the trapped alkali metal atoms based on relative circular polarizations of the first and second optical beams.

18. The method of claim 17, further comprising generating a uniform clock magnetic field during the CPT interrogation stage of the sequential clock measurement cycles, the uniform clock magnetic field having an amplitude based on Zeeman-shift characteristics of the alkali metal atoms to drive CPT interrogation of a population of the alkali metal atoms from a first energy state to a second energy state.

19. The method of claim 17, wherein periodically alternating the direction of the optical difference beam comprises:

providing the first and second optical beams to a first beam combiner to provide the optical difference beam through a first variable wave plate as a first relative circular polarization through the cell in a first direction in a first sequence;

providing the first and second optical beams to a second beam combiner to provide the optical difference beam through a second variable wave plate as a second relative circular polarization in a second direction opposite the first direction through the cell in a second sequence; and alternating between the first sequence and the second sequence.

20. The method of claim 17, wherein periodically alternating the direction of the optical difference beam comprises:

providing the first and second optical beams to a first beam combiner to provide one of the first optical beam and the second optical beam at a first linear polarization in a first sequence and a second sequence, respectively;

providing the first and second optical beams to a second beam combiner to provide one of the first optical beam and the second optical beam at a second linear polarization in the first sequence and the second sequence, respectively;

providing the linearly-polarized first and second beams to a third beam combiner to combine the first and second optical beams to provide the optical difference beam through a first variable wave plate in each of the first and second sequences to provide the optical difference beam in each of a first relative circular polarization and a second relative circular polarization, respectively, in a first direction through the cell, the optical difference beam being reflected via a mirror and provided through a second variable wave plate to provide the optical difference beam in the second direction through the cell in each of the first and second sequences to provide the optical difference beam in each of the second relative circular polarization and the first relative circular polarization, respectively, in the first sequence and the second sequence, respectively; and alternating between the first sequence and the second sequence.

21. The method of claim 17, wherein generating the optical difference beam comprises providing the optical difference beam at a difference frequency that is off-resonance of an on-resonance frequency associated with a peak corresponding to a maximum excitation of a population of the alkali metal atoms from a first energy state to a second energy state, the method further comprising adjusting the difference frequency to be one of $+\Delta$ and $-\Delta$ of the on-resonance frequency in each of the sequential clock measurement cycles to determine a difference intensity associated with the optical response of the CPT interrogated alkali metal atoms relative to the baseline intensity during the state readout stage in the sequential clock measurement cycles.

22. An atomic clock system comprising:

a magneto-optical trap (MOT) system configured to trap alkali metal atoms in a cell during a trapping stage of each of sequential clock measurement cycles;

an interrogation system configured to generate an optical difference beam comprising a first optical beam having a first frequency and a second optical beam having a second frequency different from the first frequency, the interrogation system comprising a direction controller configured to periodically alternate a direction of the optical difference beam through the cell during a CPT interrogation stage of each of the sequential clock measurement cycles to drive CPT interrogation of a population of the alkali metal atoms from a first energy state to a second energy state; and an oscillator system configured to adjust a frequency of a local oscillator based on an optical response of the CPT interrogated alkali metal atoms relative to the baseline optical response during a state readout stage in each of the sequential clock measurement cycles.

23. The system of claim 22, wherein the direction controller comprises:

a first beam combiner configured to receive the first and second optical beams to provide the optical difference beam in a first direction through the cell in a first sequence;

a second beam combiner configured to receive the first and second optical beams to provide the optical difference beam in a second direction through the cell opposite the first direction in a second sequence; and optical switches configured to alternate between the first sequence and the second sequence.

24. The system of claim 23, wherein the first beam combiner is configured to combine the first and second optical beams to provide the optical difference beam through a first variable wave plate and through the cell in the first direction at a first relative circular polarization in the first sequence, and wherein the second beam combiner is configured to combine the first and second optical beams to provide the optical difference beam through a second variable wave plate and through the cell in the second direction at a second relative circular polarization in the second sequence.

25. The system of claim 23, wherein the first beam combiner receives the first and second optical beams to provide one of the first optical beam and the second optical beam at a first linear polarization in the first sequence and the second sequence, respectively, wherein the second beam combiner receives the first and second optical beams to provide one of the second optical beam and the first optical beam at a second linear polarization in the first sequence and the second sequence, respectively, the system further comprising:

a third beam combiner configured to combine the first and second optical beams to provide the optical difference beam through a first variable wave plate in each of the first and second sequences to provide the optical difference beam in each of a first relative circular polarization and a second relative circular polarization, respectively, in a first direction through the cell in the first sequence and the second sequence, respectively; and a reflection system comprising a mirror and a second variable wave plate configured to reflect the optical difference beam in the second direction through the cell in each of the first and second sequences to provide the optical difference beam in each of the second relative circular polarization and the first relative circular polarization, respectively in the first sequence and the second sequence, respectively.

* * * * *